United States Patent
Hwang et al.

(10) Patent No.: US 12,150,089 B2
(45) Date of Patent: Nov. 19, 2024

(54) METHOD AND APPARATUS FOR TRANSMITTING AND RECEIVING SIGNAL IN WIRELESS COMMUNICATION SYSTEM

(71) Applicant: LG ELECTRONICS INC., Seoul (KR)

(72) Inventors: Seunggye Hwang, Seoul (KR); Jaehyung Kim, Seoul (KR); Youngdae Lee, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 341 days.

(21) Appl. No.: 17/714,682

(22) Filed: Apr. 6, 2022

(65) Prior Publication Data

US 2022/0330201 A1    Oct. 13, 2022

(30) Foreign Application Priority Data

Apr. 6, 2021   (KR) ................ 10-2021-0044816

(51) Int. Cl.
*H04W 68/00* (2009.01)
*H04W 24/08* (2009.01)
(Continued)

(52) U.S. Cl.
CPC ......... *H04W 68/005* (2013.01); *H04W 24/08* (2013.01); *H04W 68/02* (2013.01);
(Continued)

(58) Field of Classification Search
CPC ............ H04W 68/005; H04W 68/02; H04W 72/0446; H04W 72/23
See application file for complete search history.

(56) References Cited

U.S. PATENT DOCUMENTS 11,419,093 B2 *   8/2022   Babaei ............... H04W 72/23
11,510,176 B2 *   11/2022   He ..................... H04W 68/005
(Continued)

FOREIGN PATENT DOCUMENTS

| JP | 2024-503447 A | 1/2024 |
| WO | 2022/151059 A1 | 7/2022 |
| WO | WO-2022151405 A1 * | 7/2022 |

OTHER PUBLICATIONS

CMCC, "Discussion on paging early indication design", 3GPP TSG RAN WG1 #104-e, Jan. 25-Feb. 5, 2021, R1-2101052.
(Continued)

*Primary Examiner* — Ahmed Elallam
(74) *Attorney, Agent, or Firm* — BRYAN CAVE LEIGHTON PAISNER LLP

(57) ABSTRACT

According to at least one of embodiments of the present disclosure, a UE may receive paging early indication (PEI)-related information through higher-layer signaling, attempt to detect a PEI associated with 'M' paging occasions (POs) based on the PEI-related information, determine whether to perform or skip monitoring of a physical downlink control channel (PDCCH) in a specific PO related to the UE among the plurality of POs, based on the detected PEI, and receive at least one of paging downlink control information (DCI) carried by the PDCCH or a physical downlink shared channel (PDSCH) scheduled by the paging DCI, in a state in which the UE determines to perform monitoring of the PDCCH.

13 Claims, 17 Drawing Sheets

(51) Int. Cl.
*H04W 68/02* (2009.01)
*H04W 72/04* (2023.01)
*H04W 72/0446* (2023.01)
*H04W 72/1273* (2023.01)
*H04W 72/23* (2023.01)

(52) U.S. Cl.
CPC ... *H04W 72/0446* (2013.01); *H04W 72/1273* (2013.01); *H04W 72/23* (2023.01)

(56) References Cited

U.S. PATENT DOCUMENTS

| | | | | |
|---|---|---|---|---|
| 11,778,551 | B2* | 10/2023 | Xu | H04W 68/005 370/318 |
| 11,805,494 | B2* | 10/2023 | Xu | H04W 68/005 |
| 11,889,466 | B2* | 1/2024 | Hwang | H04W 68/005 |
| 11,902,935 | B2* | 2/2024 | Wu | H04W 68/02 |
| 2019/0239189 | A1 | 8/2019 | Hwang et al. | |
| 2020/0245246 | A1 | 7/2020 | Dhanda et al. | |
| 2022/0070783 | A1* | 3/2022 | Hsieh | H04W 52/0235 |
| 2022/0124672 | A1* | 4/2022 | Xu | H04W 72/23 |
| 2022/0225237 | A1* | 7/2022 | He | H04W 68/005 |
| 2022/0271878 | A1* | 8/2022 | Lin | H04L 5/005 |
| 2023/0079204 | A1* | 3/2023 | Nader | H04W 68/02 455/458 |
| 2023/0144750 | A1* | 5/2023 | Agiwal | H04W 76/27 455/422.1 |
| 2023/0146553 | A1* | 5/2023 | Liao | H04W 68/02 370/329 |
| 2023/0284183 | A1* | 9/2023 | Li | H04W 52/0216 455/458 |
| 2024/0163844 | A1* | 5/2024 | Ma | H04W 76/28 |

OTHER PUBLICATIONS

CATT, "UE sub-grouping mechanism with Paging Enhancement", 3GPP TSG-RAN WG2 Meeting #113 bis electronic, Apr. 12-20, 2021, R2-2102919.

Nokia, Nokia Shanghai Bell, "Detials on paging sub-grouping indication", 3GPP TSG-RAN WG2 Meeting #113bis Electronic, Apr. 12-20, 2021, R2-2103368.

CMCC, "Considerations on paging subgrouping", 3GPP TSG-RAN WG2 Meeting #113 electronic, R2-2103724.

Qualcomm Incorporated "Paging enhancements and evaluation methology," 3GPP TSG-RAN WG1 #103-e, R1-2009266, 11 pages, Nov. 2020.

Moderator (MediaTek) "Summary for Paging Enhancements," 3GPP TSG RAN WG1 e-Meeting #104, R1-2101948, 36 pages, Feb. 2021.

MediaTek Inc. "Report of email discussion [Post111-e][907][ePowSav] UE grouping (Mediatek)," 3GPP TSG-RAN WG2 Meeting #112-e, R2-2009784, 23 pages, dated Nov. 2020.

CMCC, "Discussion on paging enhancement", 3GPP TSG RAN WG1 #103-e, R1-2008021, e-Meeting, Oct. 26-Nov. 13, 2020.

Ericsson, "Design of Paging Enhancements", 3GPP TSG-RAN WG1 #104-e, R1-2101555, e-Meeting, Jan. 25-Feb. 5, 2021.

* cited by examiner (a) UE sub-group indication for UE_ID #8

(b) UE sub-group indication for UE_ID #0, #6, #8 and/or #14

METHOD AND APPARATUS FOR TRANSMITTING AND RECEIVING SIGNAL IN WIRELESS COMMUNICATION SYSTEM

TECHNICAL FIELD

The present disclosure relates to a wireless communication system, and more particularly, to a method and apparatus for transmitting and receiving a wireless signal.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

An object of the present disclosure is to provide a method of efficiently performing wireless signal transmission/reception procedures and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to an aspect of the present disclosure, a method of receiving a signal by a user equipment (UE) in a wireless communication system may include receiving paging early indication (PEI)-related information through higher-layer signaling, attempting to detect a PEI associated with 'M' paging occasions (POs) based on the PEI-related information,
  determining whether to perform or skip monitoring of a physical downlink control channel (PDCCH) in a specific PO related to the UE among the plurality of POs, based on the detected PEI, and receiving at least one of paging downlink control information (DCI) carried by the PDCCH or a physical downlink shared channel (PDSCH) scheduled by the paging DCI, in a state in which the UE determines to perform monitoring of the PDCCH. The 'M' POs may be associated with 'M' UE groups, respectively, and each UE group may include 'N' UE sub-groups. The specific PO related to the UE may be a PO associated with a specific UE group to which the UE belongs, and the specific UE group may be determined based on a UE_ID allocated to the UE. The PEI may include a UE sub-group indication field with a variable size, and the UE may process the PEI by assuming that the UE sub-group indication field includes total 'M*N' bits, based on the number of UE groups being 'M' and the number of UE sub-groups per UE group being 'N'. The UE may determine whether to perform or skip monitoring of the PDCCH based on a bit value of a specific bit related to a specific UE sub-group to which the UE belongs among the total 'M*N' bits. The UE may determine the number of UE groups to be 'M' and the number of UE sub-groups per UE group to be 'N', based on the PEI-related information received through the higher-layer signaling.

The PEI may be PEI-related DCI different from the paging DCI.

At least part of the PEI-related information may be received in a system information block (SIB).

The UE may determine the number 'M' of UE groups based on the SIB.

The UE may determine to receive the PDSCH, based on the specific UE sub-group to which the UE belongs being identified in the paging DCI as well as in the PEI.

The UE may determine not to receive the PDSCH, based on the specific UE sub-group to which the UE belongs being identified in the PEI and not being identified in the paging DCI.

The paging DCI may include UE cluster information based on a clustering method different from a UE sub-grouping method related to the PEI.

The UE may determine to receive the PDCCH based on the UE belonging to a specific UE cluster indicated by the paging DCI.

According to another aspect of the present disclosure, a processor-readable recording medium recording a program for performing the signal reception method may be provided.

According to another aspect of the present disclosure, a UE for performing the signal reception method may be provided.

According to another aspect of the present disclosure, a device for performing the signal reception method may be provided.

According to another aspect of the present disclosure, a method of transmitting a signal by a base station (BS) in a wireless communication system may include transmitting PEI-related information through higher-layer signaling, transmitting a PEI associated with 'M' POs based on the PEI-related information, and transmitting a PDCCH in a specific PO related to a first UE among the plurality of POs. The 'M' POs may be associated with 'M' UE groups, respectively, and each UE group includes 'N' UE sub-groups. The specific PO related to the first UE may be a PO associated with a specific UE group to which the first UE belongs, and the specific UE group may be determined based on a UE_ID allocated to the first UE. The PEI may include a UE sub-group indication field with a variable size, and the BS may configure the UE sub-group indication field with total 'M*N' bits, based on the number of UE groups being 'M' and the number of UE sub-groups per UE group being 'N'. The BS may instruct the first UE to monitor the PDCCH by a bit value of a specific bit related to a specific UE sub-group to which the first UE belongs among the total 'M*N' bits. The BS may signal to the first UE that the number of UE groups is 'M' and the number of UE sub-groups per UE group is 'N' by the PEI-related information.

According to another aspect of the present disclosure, a BS for performing the signal transmission method may be provided.

Advantageous Effects

According to an embodiment of the present disclosure, because a user equipment (UE) group and a UE sub-group which should monitor paging are provided in advance by a paging early indication (PEI), the power reduction effect of a radio resource control (RRC) idle/inactive UE may be enhanced.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BEST MODE

Figure 1:
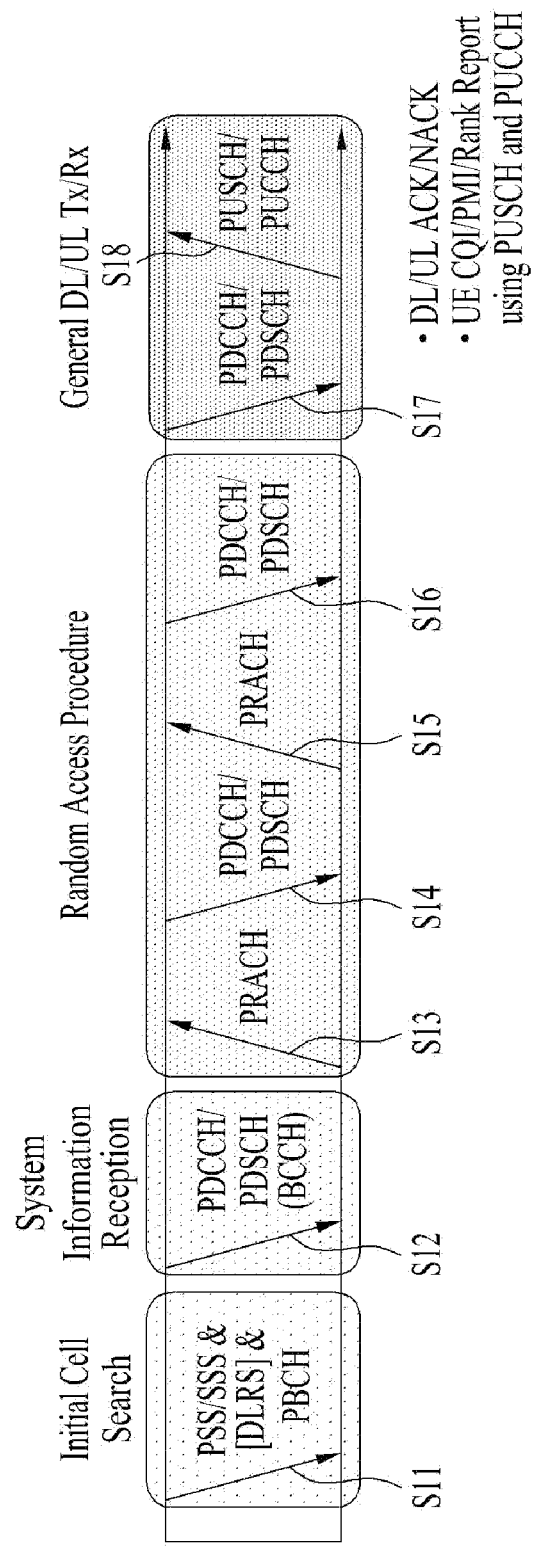
FIG. 1 illustrates physical channels used in a 3rd generation partnership project (3GPP) system as an exemplary wireless communication system, and a general signal transmission method using the same.

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In an embodiment of the present disclosure, for simplicity, this technology will be referred to as NR (New Radio or New RAT).

For the sake of clarity, 3GPP NR is mainly described, but the technical idea of the present disclosure is not limited thereto.

For the background art relevant to the present disclosure, the definitions of terms, and abbreviations, the following documents may be incorporated by reference.

3GPP LTE
  TS 36.211: Physical channels and modulation
  TS 36.212: Multiplexing and channel coding
  TS 36.213: Physical layer procedures
  TS 36.300: Overall description
  TS 36.321: Medium Access Control (MAC)
  TS 36.331: Radio Resource Control (RRC)

3GPP NR
  TS 38.211: Physical channels and modulation
  TS 38.212: Multiplexing and channel coding
  TS 38.213: Physical layer procedures for control
  TS 38.214: Physical layer procedures for data
  TS 38.300: NR and NG-RAN Overall Description
  TS 38.321: Medium Access Control (MAC)
  TS 38.331: Radio Resource Control (RRC) protocol specification
  TS 37.213: Introduction of channel access procedures to unlicensed spectrum for NR-based access Terms and Abbreviations PSS: Primary Synchronization Signal
SSS: Secondary Synchronization Signal
CRS: Cell reference signal
CSI-RS: Channel State Information Reference Signal
TRS: Tracking Reference Signal
SS: Search Space
CSS: Common Search Space
USS: UE-specific Search Space PDCCH: Physical Downlink Control Channel; The PDCCH is used to represent PDCCHs of various structures which may be used for the same purpose in the following description.
PO: Paging Occasion
MO: Monitoring Occasion
BD: Blind Decoding
DCI: Downlink Control Information
WUS: Wake Up Signal; The WUS may be used to represent other method signals or channels (e.g., a paging early indication (PEI)), which perform a similar function.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
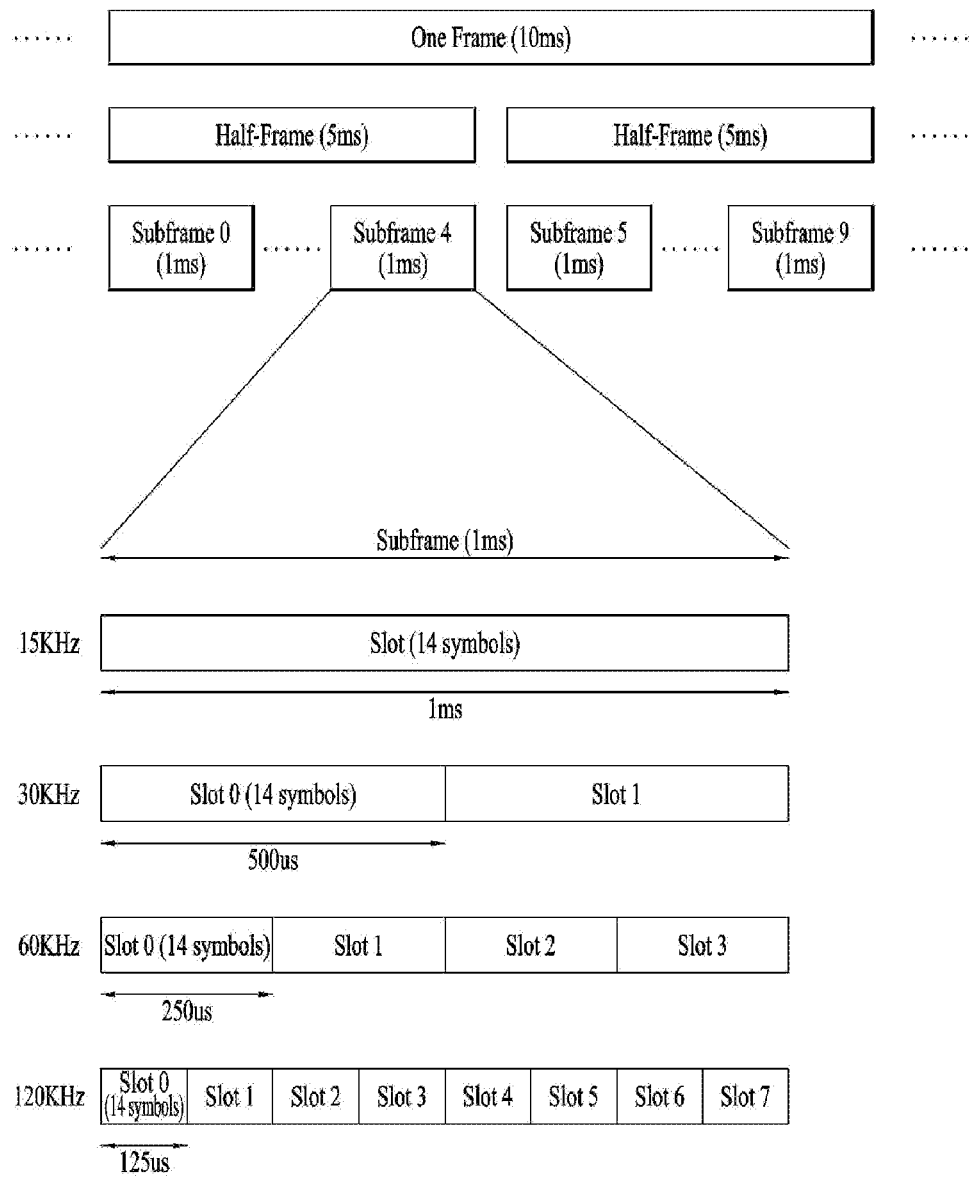
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: Number of symbols in a slot
* $N^{frame, u}_{slot}$: Number of slots in a frame
* $N^{subframe, u}_{slot}$: Number of slots in a subframe Table 2 illustrates that the number of symbols per slot, the number of slots per frame, and the number of slots per subframe vary according to the SCS when the extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
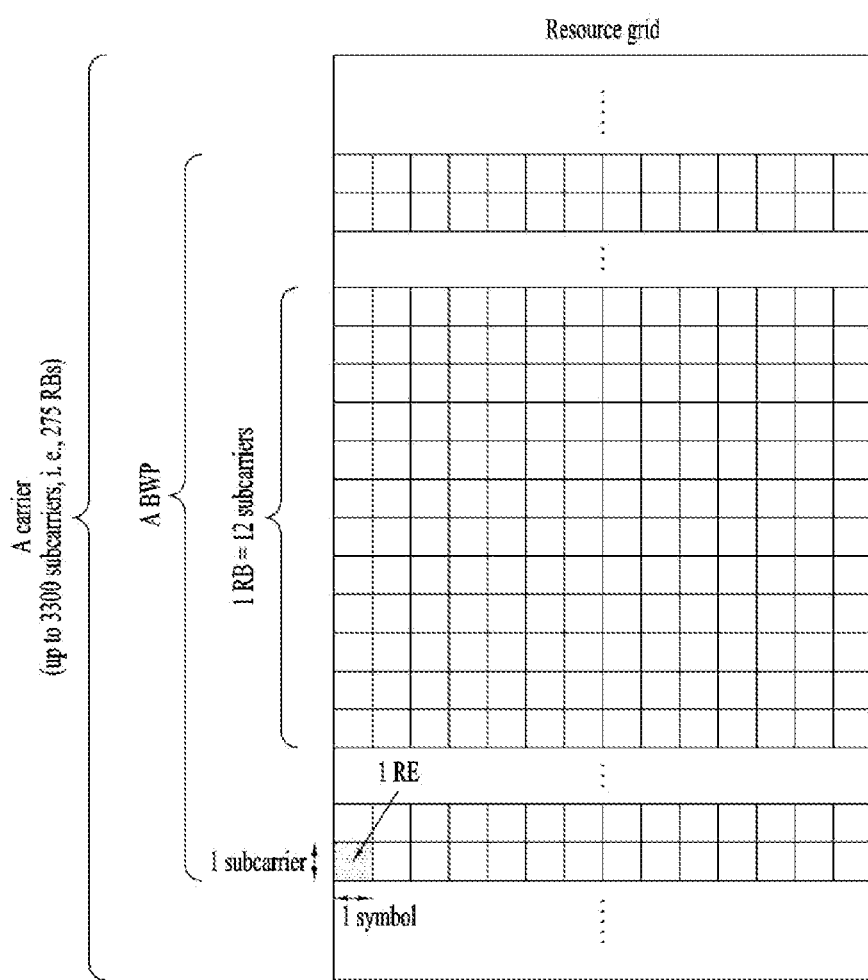
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
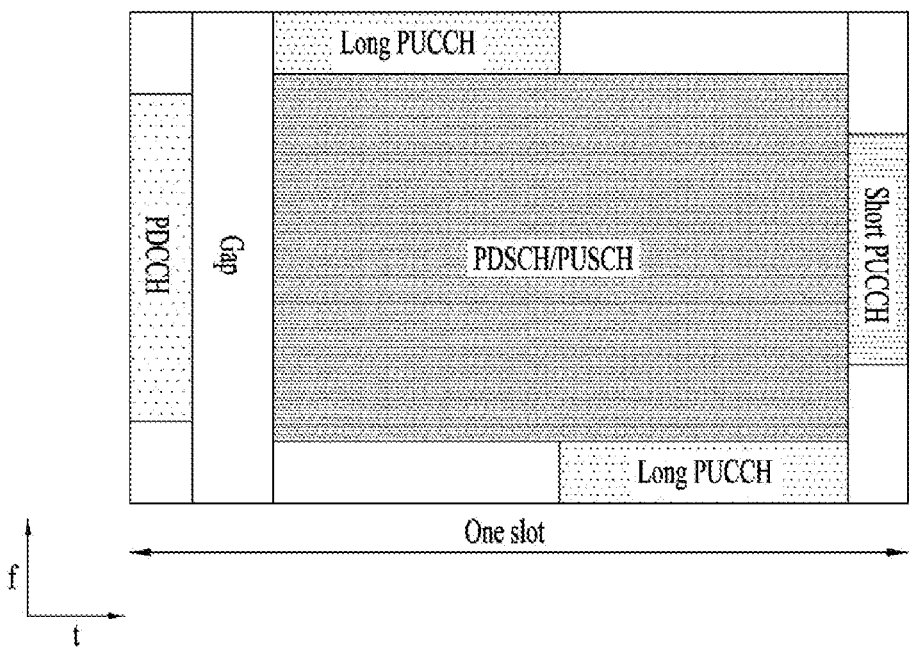
FIG. 4 illustrates exemplary mapping of physical channels in a slot.

FIG. 4 illustrates an example of mapping physical channels in a slot. In an NR system, a frame is characterized by a self-contained structure in which all of a DL control channel, DL or UL data, and a UL channel may be included in one slot. For example, the first N symbols of a slot may be used to carry a DL channel (e.g., PDCCH) (hereinafter, referred to as a DL control region), and the last M symbols of the slot may be used to carry a UL channel (e.g., PUCCH) (hereinafter, referred to as a UL control region). Each of N and M is an integer equal to or larger than 0. A resource area (hereinafter, referred to as a data region) between the DL control region and the UL control region may be used to transmit DL data (e.g., PDSCH) or UL data (e.g., PUSCH). A guard period (GP) provides a time gap for switching from a transmission mode to a reception mode or from the reception mode to the transmission mode. Some symbols at a DL-to-UL switching time in a subframe may be configured as a GP.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

Figure 5:
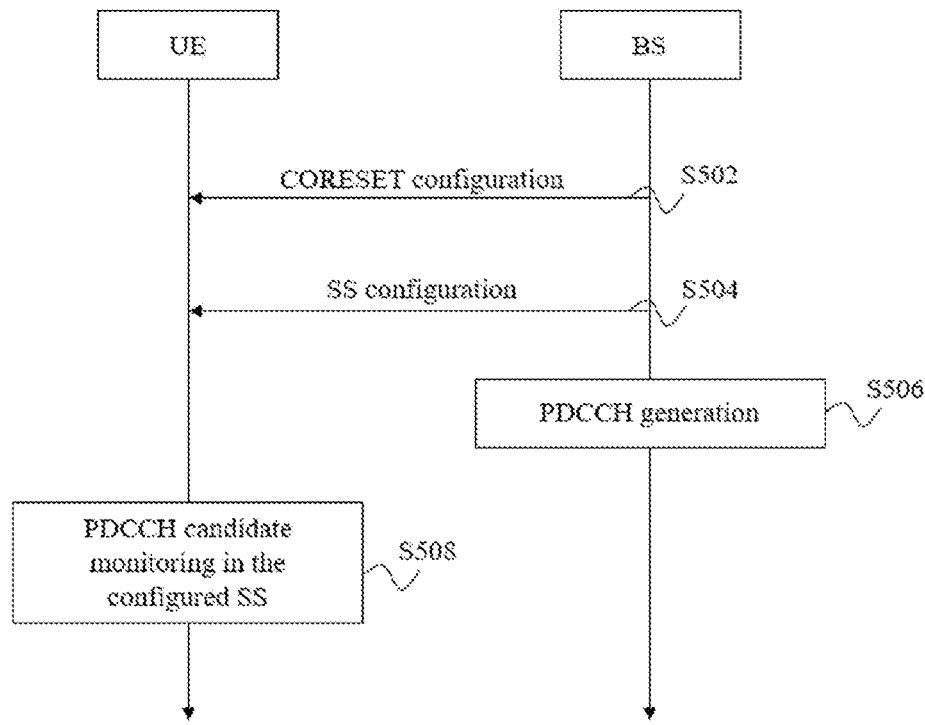
FIG. 5 illustrates an exemplary physical downlink control channel (PDCCH) transmission and reception process.

FIG. 5 illustrates an exemplary PDCCH transmission/reception process.

Referring to FIG. 5, a BS may transmit a control resource set (CORESET) configuration to a UE (S502). A CORESET is defined as a resource element group (REG) set having a given numerology (e.g., a subcarrier spacing (SCS), a cyclic prefix (CP) length, and so on). An REG is defined as one OFDM symbol by one (physical) resource block (P)RB. A plurality of CORESETs for one UE may overlap with each other in the time/frequency domain. A CORESET may be configured by system information (e.g., a master information block (MIB)) or higher-layer signaling (e.g., radio resource control (RRC) signaling). For example, configuration information about a specific common CORESET (e.g., CORESET #0) may be transmitted in the MIB. For example, a PDSCH carrying system information block 1 (SIB1) may be scheduled by a specific PDCCH, and CORESET #0 may be used to transmit the specific PDCCH. System information (SIB1) broadcast in a cell includes cell-specific PDSCH configuration information, PDSCH-ConfigCommon. PDSCH-ConfigCommon includes a list (or look-up table) of parameters related to a time-domain resource allocation, pdsch-TimeDomainAllocationList. Each pdsch-TimeDomainAllocationList may include up to 16 entries (or rows) each being joint-encoded {K0, PDSCH mapping type, PDSCH start symbol and length (SLIV)}. Aside from (additionally to) pdsch-TimeDomainAllocationList configured through PDSCH-ConfigCommon, pdsch-TimeDomainAllocationList may be provided through a UE-specific PDSCH configuration, PDSCH-Config. pdsch-TimeDomainAllocationList configured UE-specifically has the same structure as pdsch-TimeDomainAllocationList provided UE-commonly. For K0 and an SLIV of pdsch-TimeDomainAllocationList, the following description is referred to.

Further, configuration information about CORESET #N (e.g., N>0) may be transmitted by RRC signaling (e.g., cell-common RRC signaling, UE-specific RRC signaling, or the like). For example, the UE-specific RRC signaling carrying CORESET configuration information may include, but not limited to, various types of signaling such as an RRC setup message, an RRC reconfiguration message, and/or BWP configuration information. Specifically, a CORESET configuration may include the following information/fields.

controlResourceSetId: Indicates the ID of a CORESET.

frequencyDomainResources: Indicates the frequency-domain resources of the CORESET. The resources are indicated by a bitmap in which each bit corresponds to an RB group (=6 (consecutive) RBs). For example, the most significant bit (MSB) of the bitmap corresponds to a first RB group in a BWP. An RB group corresponding to a bit having a bit value of 1 is allocated as frequency-domain resources of the CORESET.

duration: Indicates the time-domain resources of the CORESET. It indicates the number of consecutive OFDM symbols included in the CORESET. The duration has a value between 1 and 3.

cce-REG-MappingType: Indicates a control channel element (CCE)-to-REG mapping type. An interleaved type and a non-interleaved type are supported.

interleaverSize: Indicates an interleaver size.

pdcch-DMRS-ScramblingID: Indicates a value used for PDCCH DMRS initialization. When pdcch-DMRS-ScramblingID is not included, the physical cell ID of a serving cell is used.

precoderGranularity: Indicates a precoder granularity in the frequency domain.

reg-BundleSize: Indicates an REG bundle size.

tci-PresentInDCI: Indicates whether a transmission configuration index (TCI) field is included in DL-related DCI.

tci-StatesPDCCH-ToAddList: Indicates a subset of TCI states configured in pdcch-Config, used for providing quasi-co-location (QCL) relationships between DL RS(s) in an RS set (TCI-State) and PDCCH DMRS ports.

Further, the BS may transmit a PDCCH search space (SS) configuration to the UE (S504). The PDCCH SS configuration may be transmitted by higher-layer signaling (e.g., RRC signaling). For example, the RRC signaling may include, but not limited to, various types of signaling such as an RRC setup message, an RRC reconfiguration message, and/or BWP configuration information. While a CORESET configuration and a PDCCH SS configuration are shown as separately signaled in FIG. 5, for convenience of description, the present disclosure is not limited thereto. For example, the CORESET configuration and the PDCCH SS configuration may be transmitted in one message (e.g., by one RRC signaling) or separately in different messages.

The PDCCH SS configuration may include information about the configuration of a PDCCH SS set. The PDCCH SS set may be defined as a set of PDCCH candidates monitored (e.g., blind-detected) by the UE. One or more SS sets may be configured for the UE. Each SS set may be a UE-specific search space (USS) set or a common search space (CSS) set. For convenience, PDCCH SS set may be referred to as "SS" or "PDCCH SS".

A PDCCH SS set includes PDCCH candidates. A PDCCH candidate is CCE(s) that the UE monitors to receive/detect a PDCCH. The monitoring includes blind decoding (BD) of PDCCH candidates. One PDCCH (candidate) includes 1, 2, 4, 8, or 16 CCEs according to an aggregation level (AL). One CCE includes 6 REGs. Each CORESET configuration is associated with one or more SSs, and each SS is associated with one CORESET configuration. One SS is defined based on one SS configuration, and the SS configuration may include the following information/fields.

searchSpaceId: Indicates the ID of an SS.
controlResourceSetId: Indicates a CORESET associated with the SS.
monitoringSlotPeriodicityAndOffset: Indicates a periodicity (in slots) and offset (in slots) for PDCCH monitoring.
monitoringSymbolsWithinSlot: Indicates the first OFDM symbol(s) for PDCCH monitoring in a slot configured with PDCCH monitoring. The first OFDM symbol(s) for PDCCH monitoring is indicated by a bitmap with each bit corresponding to an OFDM symbol in the slot. The MSB of the bitmap corresponds to the first OFDM symbol of the slot. OFDM symbol(s) corresponding to bit(s) set to 1 corresponds to the first symbol(s) of a CORESET in the slot.
nrofCandidates: Indicates the number of PDCCH candidates (one of values 0, 1, 2, 3, 4, 5, 6, and 8) for each AL where AL={1, 2, 4, 8, 16}.
searchSpaceType: Indicates CSS or USS as well as a DCI format used in the corresponding SS type.

Subsequently, the BS may generate a PDCCH and transmit the PDCCH to the UE (S506), and the UE may monitor PDCCH candidates in one or more SSs to receive/detect the PDCCH (S508). An occasion (e.g., time/frequency resources) in which the UE is to monitor PDCCH candidates is defined as a PDCCH (monitoring) occasion. One or more PDCCH (monitoring) occasions may be configured in a slot.

Table 3 shows the characteristics of each SS.

TABLE 3

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

A CCE-to-REG mapping type is configured as one of an interleaved CCE-to-REG type and a non-interleaved CCE-to-REG type.

Non-interleaved CCE-to-REG mapping (or localized CCE-to-REG mapping) (FIG. 5): 6 REGs for a given CCE are grouped into one REG bundle, and all of the REGs for the given CCE are contiguous. One REG bundle corresponds to one CCE.

Interleaved CCE-to-REG mapping (or distributed CCE-to-REG mapping): 2, 3 or 6 REGs for a given CCE are grouped into one REG bundle, and the REG bundle is interleaved within a CORESET. In a CORESET including one or two OFDM symbols, an REG bundle includes 2 or 6 REGs, and in a CORESET including three OFDM symbols, an REG bundle includes 3 or 6 REGs. An REG bundle size is set on a CORESET basis.

Figure 6:
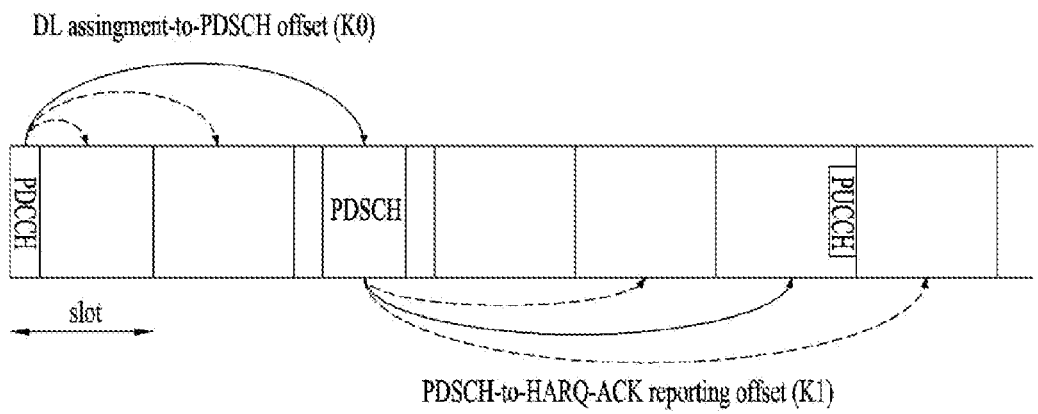
FIG. 6 illustrates an exemplary physical downlink shared channel (PDSCH) reception and acknowledgement/negative acknowledgement (ACK/NACK) transmission process.

FIG. 6 illustrates an exemplary PDSCH reception and ACK/NACK transmission process. Referring to FIG. 6, the UE may detect a PDCCH in slot #n. The PDCCH includes DL scheduling information (e.g., DCI format 1_0 or DCI format 1_1), and indicates a DL assignment-to-PDSCH offset, K0 and a PDSCH-HARQ-ACK reporting offset, K1. For example, DCI format 1_0 or DCI format 1_1 may include the following information.

Frequency domain resource assignment: Indicates an RB set allocated to a PDSCH.

Time domain resource assignment: Indicates K0 (e.g., slot offset), the starting position (e.g., OFDM symbol index) of the PDSCH in slot #n+K0, and the duration (e.g., the number of OFDM symbols) of the PDSCH. As described above, a row index of pdsch-TimeDomainAllocationList provided UE-commonly or UE-specifically may be indicated by a TDRA field.

PDSCH-to-HARQ_feedback timing indicator: Indicates K1.

HARQ process number (4 bits): Indicates the HARQ process ID of data (e.g., a PDSCH or TB).

PUCCH resource indicator (PRI): Indicates a PUCCH resource to be used for UCI transmission among a plurality of PUCCH resources in a PUCCH resource set.

After receiving a PDSCH in slot #(n+K0) according to the scheduling information of slot #n, the UE may transmit UCI on a PUCCH in slot #(n+K1). The UCI may include an HARQ-ACK response to the PDSCH. FIG. 5 is based on the assumption that the SCS of the PDSCH is equal to the SCS of the PUCCH, and slot #n1=slot #(n+K0), for convenience, which should not be construed as limiting the present disclosure. When the SCSs are different, K1 may be indicated/interpreted based on the SCS of the PUCCH.

In the case where the PDSCH is configured to carry one TB at maximum, the HARQ-ACK response may be configured in one bit. In the case where the PDSCH is configured to carry up to two TBs, the HARQ-ACK response may be configured in 2 bits if spatial bundling is not configured and in 1 bit if spatial bundling is configured. When slot #(n+K1) is designated as an HARQ-ACK transmission timing for a plurality of PDSCHs, UCI transmitted in slot #(n+K1) includes HARQ-ACK responses to the plurality of PDSCHs.

Whether the UE should perform spatial bundling for an HARQ-ACK response may be configured for each cell group (e.g., by RRC/higher layer signaling). For example, spatial bundling may be configured for each individual HARQ-ACK response transmitted on the PUCCH and/or HARQ-ACK response transmitted on the PUSCH.

When up to two (or two or more) TBs (or codewords) may be received at one time (or schedulable by one DCI) in a corresponding serving cell (e.g., when a higher layer parameter maxNrofCodeWordsScheduledByDCI indicates 2 TBs), spatial bundling may be supported. More than four layers may be used for a 2-TB transmission, and up to four layers may be used for a 1-TB transmission. As a result, when spatial bundling is configured for a corresponding cell group, spatial bundling may be performed for a serving cell in which more than four layers may be scheduled among serving cells of the cell group. A UE which wants to transmit an HARQ-ACK response through spatial bundling may generate an HARQ-ACK response by performing a (bit-wise) logical AND operation on A/N bits for a plurality of TBs.

For example, on the assumption that the UE receives DCI scheduling two TBs and receives two TBs on a PDSCH based on the DCI, a UE that performs spatial bundling may generate a single A/N bit by a logical AND operation between a first A/N bit for a first TB and a second A/N bit for a second TB. As a result, when both the first TB and the second TB are ACKs, the UE reports an ACK bit value to a BS, and when at least one of the TBs is a NACK, the UE reports a NACK bit value to the BS.

For example, when only one TB is actually scheduled in a serving cell configured for reception of two TBs, the UE may generate a single A/N bit by performing a logical AND operation on an A/N bit for the one TB and a bit value of 1. As a result, the UE reports the A/N bit for the one TB to the BS.

There are plurality of parallel DL HARQ processes for DL transmissions at the BS/UE. The plurality of parallel HARQ processes enable continuous DL transmissions, while the BS is waiting for an HARQ feedback indicating successful or failed reception of a previous DL transmission. Each HARQ process is associated with an HARQ buffer in the medium access control (MAC) layer. Each DL HARQ process manages state variables such as the number of MAC physical data unit (PDU) transmissions, an HARQ feedback for a MAC PDU in a buffer, and a current redundancy version. Each HARQ process is identified by an HARQ process ID.

Figure 7:
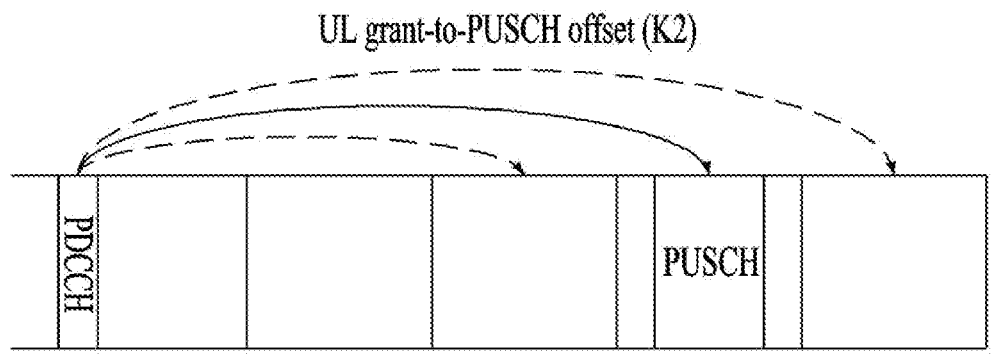
FIG. 7 illustrates an exemplary physical uplink shared channel (PUSCH) transmission process.

FIG. 7 illustrates an exemplary PUSCH transmission procedure. Referring to FIG. 7, the UE may detect a PDCCH in slot #n. The PDCCH includes DL scheduling information (e.g., DCI format 1_0 or 1_1). DCI format 1_0 or 1_1 may include the following information.

Frequency domain resource assignment: Indicates an RB set assigned to the PUSCH.

Time domain resource assignment: Indicates a slot offset K2 and the starting position (e.g. OFDM symbol index) and duration (e.g. the number of OFDM symbols) of the PUSCH in a slot. The starting symbol and length of the PUSCH may be indicated by a start and length indicator value (SLIV), or separately.

The UE may then transmit a PUSCH in slot #(n+K2) according to the scheduling information in slot #n. The PUSCH includes a UL-SCH TB.

Paging

The network may (i) access to UEs in RRC_IDLE, RRC_INACTIVE, and RRC_CONNECTED states by paging messages, and (ii) indicate a system information change and an earthquake and tsunami warning system/commercial mobile alert system (ETWS/CMAS) notification to UEs in the RRC_IDLE and RRC_INACTIVE states and UEs in the RRC_CONNECTED state by short messages. Both a paging message and a short message are transmitted based on a P-RNTI-based PDCCH. The paging message is transmitted on a logical channel, paging control channel (PCCH), whereas the short message is directly transmitted on a physical channel, PDCCH. Because the logical channel, PCCH is mapped to a physical channel, PDSCH, the paging message may be understood as scheduled based on a P-RNTI-based PDCCH.

While the UE stays in the RRC_IDLE state, the UE monitors a paging channel for core network (CN)-initiated paging. In the RRC_INACTIVE state, the UE also monitors the paging channel, for radio access network (RAN)-initiated paging. The UE does not need to monitor the paging channel continuously. Paging discontinuous reception (DRX) is defined as monitoring a paging channel only during one paging occasion (PO) per DRX cycle by a UE in the RRC_IDLE or RRC_INACTIVE state. A paging DRX cycle is configured by the network, as follows.

1) In the case of CN-initiated paging, a default cycle is broadcast in system information.

2) In the case of CN-initiated paging, a UE-specific cycle is configured by NAS signaling.

3) In the case of RAN-initiated signaling, a UE-specific cycle is configured by RRC signaling.

Because all of POs of the UE for CN-initiated signaling and RAN-initiated signaling are based on the same UE ID, the two POs overlap with each other. The number of POs in a DRX cycle may be set by system information, and the network may distribute UEs to the POs based on IDs.

When the UE is in the RRC_CONNECTED state, the UE monitors a paging channel in each PO signaled by system information, for an SI change indication and a PWS notification. In bandwidth adaptation (BA), the RRC_CONNECTED UE monitors only a paging channel in an active BWP in which a configured CSS is located.

In shared spectrum channel access, additional PDCCH monitoring occasions may be configured in a PO of the UE, for paging monitoring. However, when the UE detects a P-RNTI-based PDCCH transmission in its PO, the UE does not need to monitor subsequent PDCCH monitoring occasions in the PO.

To reduce power consumption, the UE may use DRX in the RRC_IDLE and RRC_INACTIVE states. The UE monitors one PO per DRX cycle. A PO is a set of PDCCH monitoring occasions, and may include multiple time slots (e.g., subframes or OFDM symbols) in which paging DCI may be transmitted. One paging frame (PF) is one radio frame and may include one or more POs or the starting points of one or more POs.

In a multi-beam operation, the UE assumes that the same paging message and the same short message are repeated in all transmission beams. The paging message is the same for both of RAN-initiated paging and CN-initiated paging.

Upon receipt of RAN-initiated paging, the UE initiates an RRC connection resume procedure. Upon receipt of CN-initiated paging in the RRC_INACTIVE state, the UE transitions to the RRC_IDL state and notifies the NAS of the CN-initiated paging.

A PF and a PO for paging are determined in the following manner

An SFN for the PF is determined by:

$$(SFN+PF\_offset) \bmod T = (T \text{ div } N)*(UE\_ID \bmod N)$$

An index i_s indicating the index of the PO is determined by:

$$i\_s = \text{floor}(UE\_ID/N) \bmod Ns$$

The following parameters may be used to calculate the PF and i_s above.
- T: The DRX cycle of the UE (T is determined by the smallest of UE-specific DRX values (if configured by RRC and/or an upper layer) and a default DRX value broadcast in system information. In the RRC_IDLE state, if UE-specific DRX is not configured by an upper layer, the default value is applied).
- N: Number of total paging frames in T
- Ns: Number of POs for a PF
- PF_offset: Offset used for PF determination
- UE ID: 5G-S-TMSI mod 1024

WUS (Wake-Up Signal)/PEI (Paging Early Indication)

In LTE Rel-15 NB-IoT and MTC, a wake-up signal (WUS) was introduced to save power of a UE. The WUS is a signal indicating preliminarily whether there is an actual paging transmission in a paging SS at a specific position. When the BS wants to transmit paging in a PO at a specific position, the BS may transmit a WUS at WUS transmission position(s) associated with the PO. The UE monitors the WUS transmission positions associated with the PO at the specific position. Upon detection of the WUS at the WUS transmission position(s), the UE may expect that paging will be transmitted in the PO, whereas when failing to detect the WUS at the WUS transmission position(s), the UE may not expect paging in the PO. The gain of power saving may be achieved by this operation. In LTE Rel-16 NB-IoT and MTC, a UE-group WUS was introduced to increase the power saving gain of the Rel-15 WUS. The UE-group WUS may advantageously reduce an unnecessary wakeup prob-ability of a UE by using a WUS transmission position and sequence determined based on the UE-group ID of the UE.

Figure 8:
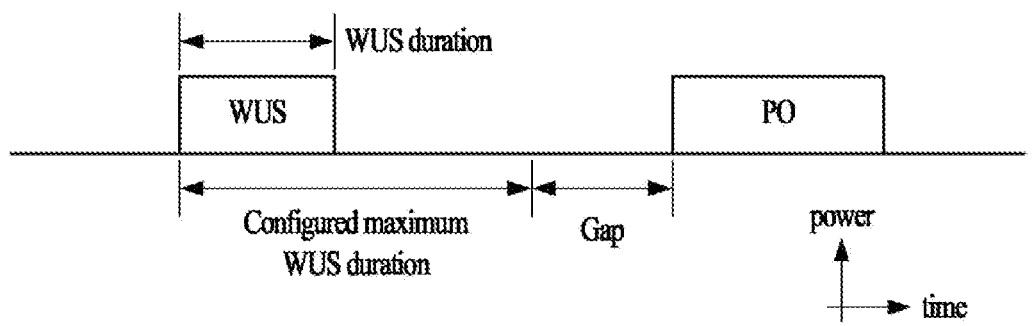
FIG. 8 illustrates a long term evolution (LTE)-based wake-up signal.

FIG. 8 is a diagram illustrating a WUS in an LTE system. Referring to FIG. 8, in MTC and NB-IoT, the WUS may be used to reduce power consumption related to paging monitoring. The WUS is a physical layer signal indicating whether a UE is supposed to monitor a paging signal (e.g., an MPDCCH/NPDCCH scrambled with a P-RNTI) according to a cell configuration. For a UE which is not configured with eDRX (i.e., configured only with DRX), the WUS may be associated with one PO (N=1). On the contrary, for a UE configured with eDRX, the WUS may be associated with one or more POs (N≥1). Upon detection of the WUS, the UE may monitor N POs after being associated with the WUS. When failing to detect the WUS, the UE may maintain sleep mode by skipping PO monitoring until the next WUS monitoring. The UE may receive WUS configuration information from the BS and monitor the WUS based on the WUS configuration information. The WUS configuration information may include, for example, a maximum WUS duration, the number of consecutive POs associated with the WUS, and gap information. The maximum WUS duration may refer to a maximum time period during which the WUS may be transmitted, and may be expressed as a ratio to a maximum repetition number (e.g., Rmax) related to a PDCCH (e.g., MPDCCH or NPDCCH). Although the UE may expect repeated WUS transmissions within the maximum WUS duration, the number of actual WUS transmissions may be less than a maximum number of WUS transmissions within the maximum WUS duration. For example, the number of WUS repetitions may be small for a UE in good coverage. A resource/occasion in which the WUS may be transmitted within the maximum WUS duration is referred to as a WUS resource. The WUS resource may be defined as a plurality of consecutive OFDM symbols by a plurality of consecutive subcarriers. The WUS resource may be defined as a plurality of consecutive OFDM symbols by a plurality of consecutive subcarriers in a subframe or slot. For example, the WUS resource may be defined as 14 consecutive OFDM symbols by 12 consecutive subcarriers. Upon detection of the WUS, the UE does not monitor the WUS until a first PO associated with the WUS. When the WUS is not detected during the maximum WUS duration, the UE does not monitor a paging signal in POs associated with the WUS (or the UE remains in the sleep mode).

In a communication system such as NR, it may be indicated by a paging early indication (PEI) (e.g., a PEI based on a sequence or DCI) whether the UE should monitor paging DCI in a PO or whether paging DCI is provided. When the UE succeeds in detecting the PEI, the UE monitors the paging DCI (and/or a PDSCH carrying a corresponding paging message). When failing in detecting the PEI, the UE may skip monitoring of the paging DCI in the PO.

UE Group & Sub-Group Indication for Paging

In communication systems such as LTE and NR, paging is used for the purpose of triggering RRC setup, system information modification, and/or a PWS/ETWS notification. The UE monitors a PDCCH at the position of a PO configured by the BS and, when detecting DCI scrambled with a P-RNTI, performs an operation indicated by the DCI.

In LTE Rel-15 NB-IoT and MTC, the WUS was introduced to save power of a UE. The WUS is a signal indicating whether an actual paging transmission exists in a PO at a specific position. When the BS wants to transmit paging in the PO at the specific position, the BS may transmit the WUS at WUS transmission position(s) associated with the PO. The UE monitors the WUS transmission position(s) associated with the PO at the specific position. Upon detection of the WUS at the WUS transmission position(s), the UE may expect that paging will be transmitted in the PO. When the UE fails to detect the WUS at the WUS transmission position(s), the UE does not expect paging in the PO. This operation may bring the gain of power saving. In LTE Rel-16 NB-IoT and MTC, the UE-group WUS was introduced to increase the power saving gain of the Rel-15 WUS. The UE-group WUS is advantageous in that the unnecessary wake-up probability of a UE may be reduced by using a WUS transmission position and sequence determined based on the UE group ID of the UE.

In Rel-16 NR, a DCI-based power saving technique was introduced to support power saving in connected mode. For this purpose, a new DCI format, DCI format 2-6 has been introduced. The UE receives an indication of the position of a bit to be monitored from the BS by DCI format 2-6, and determines a power saving operation in an active time period based on bit information at the position.

As discussed in Rel-16 NB-IoT and MTC, when idle-mode/inactive-mode UEs monitor POs, transmission of paging to another UE sharing the same PO with a UE may cause unnecessary wake-up, increasing the power consumption of the UE. As described before, although a DCI-based method has been introduced in the current NR to reduce unnecessary monitoring of a connected-mode UE and thus obtain a power saving effect, the same (or similar) method is yet to be defined for an idle-mode/inactive-mode UE. To this end, the introduction of a PEI indicating whether a UE needs to wake up in a PO for the purpose of power saving of the UE is under discussion in Rel-17 NR. One of the power saving effects expectable from the PEI is reduction of unnecessary wake-up of the UE through introduction of a UE sub-group indication.

Based on the current Rel-16 NR standard, a method of generating a plurality of UE groups based on the UE_IDs of UEs and distinguishing the UE groups by time-domain resources is used. Specifically, TS 38.304 Rel.16 describes UE grouping based on UE_IDs, as illustrated in Table 5 below.

Referring to Table 5, each PO may correspond to a plurality of UEs (i.e., a UE group). Each UE may identify the index i_s of a PO that it needs to monitor, based on a parameter Ns, a parameter N, and a UE_ID. The parameters Ns and N may refer to parameters determined based on higher-layer signaling (e.g., SIB1).

In an example of the present disclosure, a UE group may be subdivided into a plurality of UE sub-groups. For example, UE sub-groups may be used to further divide each UE group and individually indicate whether a paging message is transmitted or received. When the UE has prior knowledge of no transmission/reception of a paging message for a UE sub-group to which the UE belongs through a PEI (before a corresponding PO), the UE may skip a PDSCH decoding procedure for receiving a paging message, thus obtaining the gain of power saving.

In general, it may be expected that the gain of power saving through UE sub-grouping will increase as UE sub-groups are more elaborately defined. On the other hand, when information about a UE sub-group is transmitted in a specific signal or channel, the amount of information to be included in the signal/channel may increase significantly. Therefore, detection/decoding performance may be degraded or resource overhead may increase.

One of the important factors to be considered in a PEI design process is an increase in signaling overhead for PEI transmission and reception. The BS needs to transmit a PEI to inform the UE whether paging is transmitted. This may cause additional overhead on the part of the BS. To solve the overhead problem, a method of associating one PEI with a plurality of POs (e.g., associating one PEI-RNTI with a plurality of PO indexes) is under discussion through Rel-17 NR standardization. When the function of a PEI (hereinafter referred to as OtoM_PEI) that may be associated with a plurality of POs is applied, the BS is capable of indicating whether paging is transmitted to a plurality of UE groups (or POs) by one PEI, and thus a gain may be expected in terms of reduction of signaling overhead caused by the PEI. To prevent a UE from unnecessarily monitoring its PO due to paging for another UE group, indication information for multiple UE groups may need to be added to the PEI,

TABLE 5

7.1 Discontinuous Reception for paging

The UE may use Discontinuous Reception (DRX) in RRC_IDLE and RRC_INACTIVE state in order to reduce power consumption. The UE monitors one paging occasion (PO) per DRX cycle. A PO is a set of PDCCH monitoring occasions and can consist of multiple time slots (e.g. subframe or OFDM symbol) where paging DCI can be sent (TS 38.213 [4]). One Paging Frame (PF) is one Radio Frame sad may contain one or multiple PO(s) or starting point of a PO.
The PF and PO for paging are determined by the following formulae:
   SFN for the PF is determined by:|
      (SFN + PF_offset) mod T = (T div N)*(UE_ID mod N)
   Index (i_s), indicating the index of the PO is determined by:
      i_s = floor (UE_ID/N) mod Ns
The following parameters are used for the calculation of PF and i_s above:
     T: DRX cycle of the UE (T is determined by the shortest of the UE specific DRX value(s), if configured by RRC
       and/or upper layers, and a default DRX value broadcast in system information. In RRC_IDLE state, if UE
       specific DRX is not configured by upper layers, the default value is applied).
     N: number of total paging frames in T
     Ns: number of paging occasions for a PF
     PF_offset: offset used for PF determination
     UE_ID: 5G-S-TMSI mod 1024
Parameters Ns, nAndPagingFrameOffset, nrofPDCCH-MonitoringOccasionPerSSB-InPO, and the length of default DRX Cycle are signaled in SIB1. The values of N and PF_offset are derived from the parameter nAndPagingFrameOffset as defined in TS 38.331 [3]. The parameter first-PDCCH-MonitoringOccasionOfPO is signalled in SIB1 for paging in initial DL BWP. For paging in a DL BWP other than the initial DL BWP, the parameter first-PDCCH-MonitoringOccasionOfPO is signaled in the corresponding BWP configuration.

resulting in an increase in the amount of signal/channel information. Further, when the function of the OtoM_PEI is provided together with a UE sub-group indication through the PEI, the configuration of indicated information and a related method of operating a UE should be defined.

Based on this background, methods of configuring information applicable when information about an OtoM_PEI and a UE sub-group indication is provided by a PEI and paging DCI, and associated UE operations are proposed. The proposed methods may increase the detection performance of a PEI or enhance the effect of saving required resources per transmission by distributing information to be provided through the PEI. Further, a limited amount of information is adaptively configured, and thus an additional resource saving gain of a UE may be expected. While proposed methods focusing on transmission and reception of a PEI indicating preliminarily whether paging is transmitted or received to a UE and a transmission and reception operation in an associated PO are described below, the present disclosure is not limited to the proposed methods, and those skilled in the art will understand that the present disclosure is generally applicable to a signal or channel indicating whether a specific channel is transmitted and received and an associated relationship with the specific channel.

As an example to which the methods proposed in the present disclosure are applied, they may be used to preliminarily transmit and receive information related to paging transmission before the paging transmission in communication systems such as LTE and NR. However, the proposed methods are not limited to the above example, and may be generally applied to other scheduling methods in which transmission and reception of a specific signal/channel may be expected, without departing from the spirit of the present disclosure.

BS Operation

Figure 9:
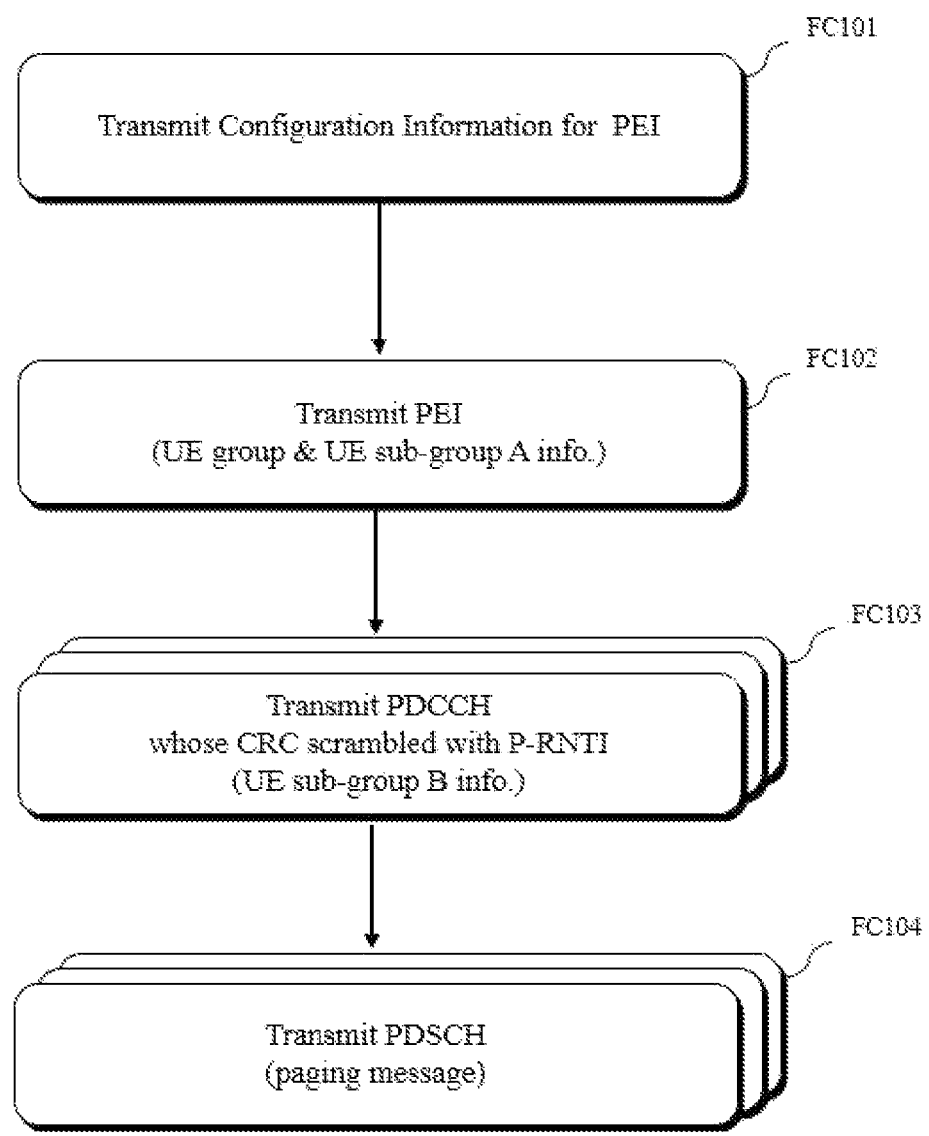
FIG. 9 is a flowchart illustrating an operation of a base station (BS) according to an embodiment of the present disclosure.

FIG. 9 is a flowchart illustrating an exemplary BS operation to which a proposed method of the present disclosure is applicable.

Referring to FIG. 9, a BS may generate configuration information related to a PEI and transmit the configuration information (FC101). For example, the configuration information may be transmitted by (at least one) higher-layer signal (e.g. an SIB or RRC signaling). The information provided through the higher-layer signal may include at least one of information about a UE group, information about a UE sub-group, or information about a PEI-RNTI. At least part of the PEI-related configuration information may be provided through SIBx.

When there is paging information to be transmitted to specific UE(s), the BS may transmit a PEI based on the PEI-related configuration information (FC102). The PEI may be DCI of a specific format, and the DCI may be transmitted on a PDCCH with a CRC scrambled with a PEI-RNTI. When the PEI is configured to correspond to a plurality of UE groups, the PEI may include information about the UE groups. Further, when the PEI may include information about a plurality of UE sub-groups, the PEI may include the whole or part of the information about the UE sub-groups. For convenience, the information about the UE sub-groups included in the PEI may be referred to as UE sub-group A information.

Thereafter, the BS generates paging DCI for each UE group (e.g., each UE group to which paging is indicated through the PEI), and transmits the paging DCI on a PDCCH (e.g., a PDCCH with a CRC scrambled with a P-RNTI), wherein each PDCCH may be transmitted in PO(s) configured for each UE group (FC103).

For example, the PEI may be configured to completely specify UE sub-groups to be paged. For example, the PEI may be configured such that the UE sub-groups to be paged are specified only by the UE sub-group A information.

In another example, the PEI may be configured such that the UE sub-groups to be paged are specified by a combination of the PEI and the paging DCI. In this case, UE sub-group information included in the paging DCI is referred to as UE sub-group B information. When the UE sub-groups to be paged are specified only by the UE sub-group A information, the UE sub-group B information may be omitted.

In the presence of a paging message (e.g., PDSCH) to be transmitted, the BS may transmit paging DCI including scheduling information for transmission of the paging message.

Thereafter, when there is a paging message to be transmitted, the BS may transmit a PDSCH including the paging message based on scheduling information about the PDSCH transmitted on the PDCCH (FC104). When there is no paging message to be transmitted by the BS, this operation may be skipped.

UE Operation

Figure 10:
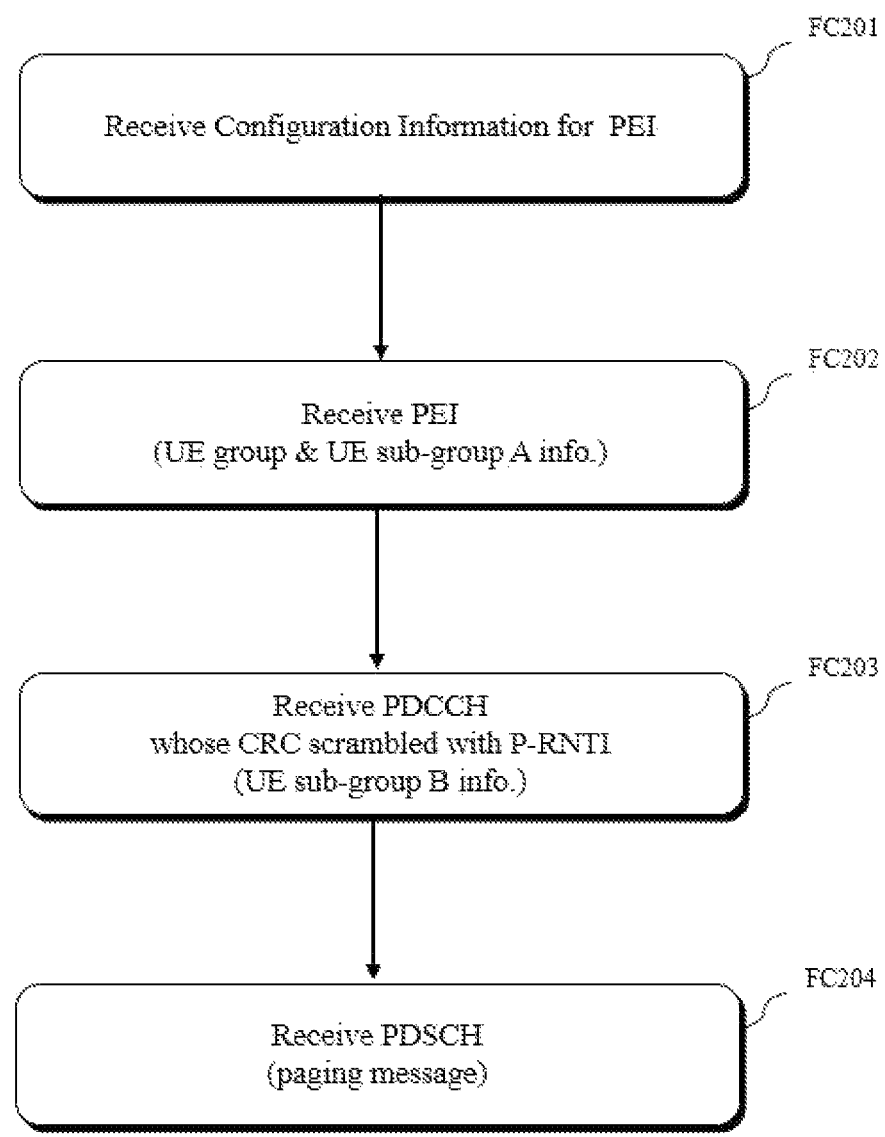
FIG. 10 is a flowchart illustrating an operation of a user equipment (UE) according to an embodiment of the present disclosure.

FIG. 10 is a flowchart illustrating an exemplary UE operation to which a proposed method of the present disclosure is applicable.

Referring to FIG. 10, a UE may receive configuration information related to a PEI from a BS (FC201). For example, the configuration information may be received in (at least one) higher-layer signal (e.g. an SIB or RRC signaling). The information provided through the higher-layer signal may include at least one of information about a UE group, information about a UE sub-group, or information about a PEI-RNTI. At least part of the PEI-related configuration information may be provided through SIBx.

The UE may attempt to detect the PEI based on the received PEI-related configuration information and receive the PEI (FC202). The PEI may be DCI of a specific format, and the DCI may be received through a PDCCH with a CRC scrambled with a PEI-RNTI. The UE may perform PEI-RNTI-based blind detection on a PEI search space. In this case, when the PEI is configured to correspond to a plurality of UE groups, the UE may expect to receive information about the UE groups in the PEI, and the PEI may also include information about a plurality of UE sub-groups.

Thereafter, when the UE is instructed to perform a reception operation in a PO corresponding to a UE group to which it belongs through PEI information at a reception position of the PEI, the UE may monitor a PDCCH for detecting paging DCI at the position of the PO (FC203).

For example, the PEI may be configured to completely specify UE sub-groups to be paged. For example, the PEI may be configured to specify the UE sub-groups to be paged only by UE sub-group A information.

In another example, the PEI may be configured to specify the UE sub-groups to be paged through a combination of the PEI and the paging DCI. In this case, UE sub-group information included in the paging DCI is referred to as UE sub-group B information. For example, the PEI may be configured to specify the UE sub-groups to be paged only through the UE sub-group A information.

Thereafter, when the UE is instructed to receive a paging message corresponding to its UE sub-group by the PDCCH and receives scheduling information about a PDSCH for the reception, the UE may expect to receive the PDSCH including the paging message based on the scheduling information about the PDSCH, received on the PDCCH (FC204). When no PDSCH transmission for the UE is indicated to the UE in the previous step, the corresponding operation may be skipped.

One or more of the following embodiments may be implemented in combination or individually. Some terms, symbols, sequences, and so on may be replaced by other terms, symbols, sequences, and so on.

While a signal or channel to carry information related to paging, particularly to indicate whether paging is transmitted will be described by way of example to explain the principle of the present disclosure, the proposed methods are not limited to the type of the physical signal/channel or the purpose of information delivered by the signal/channel, unless otherwise specified. Therefore, it is obvious that the proposed methods of the present disclosure are applicable to any kind of physical signal/channel and the purpose of information delivered by the signal/channel within the principle of the present disclosure, even though there is no separate explanation.

While an NR system is taken as an example to describe the principle of the present disclosure, the proposed methods are not limited to any particular transmission/reception type in NR, unless otherwise stated. Accordingly, it is obvious that the proposed methods are applicable to any wireless communication transmission/reception structure within the principle of the present disclosure.

In the present disclosure, the following terms are defined and used, for convenience of description. The terms defined and used below are used to help the understanding of the present disclosure, and concepts proposed in the present disclosure are not limited to the terms.

In the present disclosure, a signal or channel configured to indicate whether a paging PDCCH/PDSCH is transmitted in a specific PO is defined as a PEI, and the PEI is described. While the following description is given in the context of a PEI configured to provide information in the form of DCI, the proposed methods may also be applied to other types of PEIs (e.g., information is distinguished by a sequence), even though there is no separate explanation.

[Indicating Both UE Group and UE Sub-Group Using PEI]

In this embodiment, a structure in which a PEI may provide both indication information for a UE group and indication information for a UE sub-group is considered. Among a plurality of UE sub-groups belonging to an indicated UE group, UEs belonging to an indicated UE sub-group may expect to receive paging DCI with a CRC scrambled with a P-RNTI in a corresponding PO.

For example, when the PEI is configured as DCI of a specific format, the DCI (hereinafter referred to as PEI DCI) used for transmission of the PEI may include at least one bit field to provide information about a UE group and information about a UE sub-group. For example, a bit field for providing the information about the UE group and a bit field for providing the information about the UE sub-group may exist separately, or one bit field (e.g., a bitmap of a size of the number of UE groups*the number of UE sub-groups per UE group) may indicate both the information about the UE group and the information about the UE sub-group.

Proposal 1: Size of UE Group/Sub-Group Indication Field in PEI DCI

The size (number of bits) of a field included in PEI DCI may be configured by the BS. The BS may transmit one or more parameters for determining the field size in at least one higher-layer signal such as an SIB. The size (e.g., variable field size) of at least one field included in the PEI DCI may be determined based on higher-layer parameters provided by the BS. In addition, the BS may provide information about the payload size of the PEI DCI in addition to the information about the size of the individual field to the UE by higher-layer signaling.

For example, when the payload size of the PEI DCI is indicated as X, the UE may attempt to detect (blind-detect) a PDCCH with a CRC scrambled with a PEI-RNTI based on the DCI size of X bits.

For example, the UE may obtain parameters for a field size through at least one higher-layer signaling such as an SIB transmitted by the BS, and determine the size Y of a specific field included in the PEI DCI based on the parameters.

For example, when the UE detects a PDCCH with a CRC scrambled with a PEI-RNTI and obtains X bits, the UE may decode the X bits, assuming that Y bits at a predefined position among the X bits are a UE group/sub-group indication field. When the UE erroneously calculates at least one of the X value or the Y value, the UE may not correctly decode the PEI DCI received from the BS, and as a result, transmission and reception of a paging message may be impossible. Therefore, a common understanding between the UE and the BS is required for the PEI DCI payload size and the field size.

An example of the present disclosure may include a field providing information about a UE group (hereinafter referred to as a UE group indication field) as one of bit fields with a configurable field size. The size of the configurable UE group indication field may be determined based on a mapping relationship between a PEI and a PO. For example, the UE group indication field size may be determined according to the number of POs associated with one PEI. In other words, the relationship between a PEI and a PO may be determined by the number of POs that one PEI may indicate (i.e. the number of UE groups distinguishable by information included in the PEI). For example, when one PEI includes information that may distinguish M UE groups (M>1), the size of the UE group indication field may be set to M bits, and the UE group indication field may be given in the form of a bitmap in which each bit corresponds to a different UE group. The number M of POs associated with one PEI may be determined based on an SIB transmitted by the BS. When bit(s) mapped to a PO (UE group) has a value of 1 in the above example, a paging procedure may be performed in the PO belonging to the UE group, while the bit(s) has a value of 0, the paging procedure may not be performed in the PO.

In another example, when one PEI is configured to include information corresponding to only one UE group, the size of the UE group indication field in the PEI is 0 bit, or even though the size of the UE group indication field is 1 bit, it may be regulated that the UE group indication field is not used for the purpose of indicating a UE group (or is used for other purposes).

This method is advantageous in that when the BS guarantees scheduling flexibility to adjust the relationship between a PEI and a PO according to a network condition, an unnecessary increase in the overhead of PEI DCI may be prevented.

Further, a field providing information about a UE sub-group (hereinafter, referred to as a UE group indication field) may be one of configurable bit fields. Specifically, one of the following options 1-1-1, 1-1-2, and 1-1-3 may be applied.

Option 1-1-1) The size of the UE sub-group indication field may be determined based on the number of UE sub-groups configured by a higher-layer signal. For example, the size of the UE sub-group indication field may be independently configured by a separately designated parameter. This may be advantageous in terms of scheduling flexibility with which the BS may adjust the payload of PEI DCI in consideration of a network environment and the power consumption efficiency of a UE.

Option 1-1-2) The total number of bits included in the UE sub-group indication field and the UE group indication field may be set to be always constant. For example, in the case where the size of bits available to represent the two fields is $N_{total}$, it may be regulated that when the size of the UE group indication field is indicated as M bits by a higher-layer signal, the size of the UE sub-group indication field is determined to be $N_{total}$-M bits. This method may advantageously provide flexibility so that the BS may control information provided through a PEI in consideration of a network environment and the power consumption efficiency of a UE, while maintaining the payload of PEI DCI in a constant size.

Option 1-1-3) The size of the UE sub-group indication field may be set to increase in proportion to the number of UE groups that may be indicated by PEI DCI. For example, when the number of UE sub-groups per UE group distinguishable by a PEI is denoted by $N_{perGroup}$, and M UE groups are distinguishable by the PEI, $M*N_{perGroup}$ bits may serve the purpose of indicating a UE sub-group. When this method is used, one UE sub-group indication field in PEI DCI may provide UE group information as well as a UE sub-group indication function, rather than the UE group indication field is configured separately from the UE sub-group indication field in the PEI DCI. This may be done to ensure a minimum granularity level or higher for distinguishing UE sub-group indications provided for each UE group, regardless of the number of UE groups distinguishable through a PEI.

Figure 14:
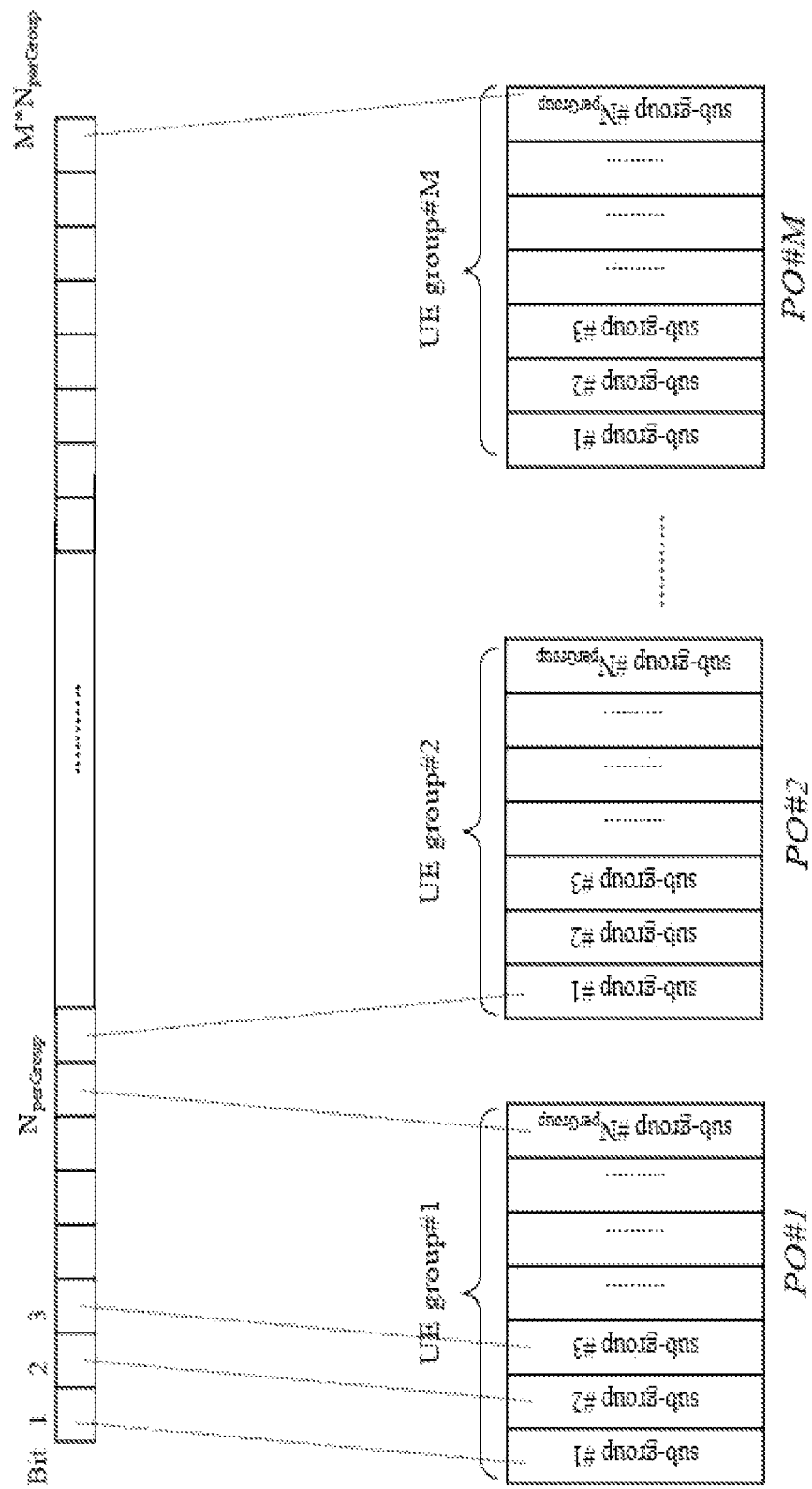
FIG. 14 illustrates a UE sub-group indication field included in a paging early indication (PEI) according to an embodiment of the present disclosure.

FIG. 14 illustrates an exemplary configuration of a UE sub-group indication field according to Option 1-1-3. Referring to FIG. 14, a UE sub-group indication field included in a PEI is associated with M POs (e.g., M UE groups), and one PO includes $N_{perGroup}$ UE sub-groups. For example, the number of UE sub-groups per PO may be equally set to $N_{perGroup}$ for all POs. The UE sub-group indication field may be in the form of a bitmap of a variable size, as one bit field included in the PEI. The UE should determine the size of the UE sub-group indication field with a variable size to interpret (process, decode, and parse) each field included in the PEI. The UE may determine the number M of UE groups through higher-layer signaling information (e.g., SBI1) received from the BS. The UE may determine the number $N_{perGroup}$ of UE sub-groups per PO based on higher-layer signaling information received from the BS. Each of the number M of UE groups and the number $N_{perGroup}$ of UE sub-groups may be indicated by separate higher-layer signalings or may be related to the same higher layer signaling. For example, the UE may determine the number M of UE groups and the number $N_{perGroup}$ of UE sub-groups, respectively, and determine the size of the UE sub-group indication field to be $M*N_{perGroup}$ bits. For example, the UE may decode/process/interpret the PEI by assuming that Y (=$M*N_{perGroup}$) bits among total X bits included in the PEI are the UE sub-group indication field. The constraint that Y does not exceed X may be imposed. For example, the number of UE groups and the number of UE sub-groups may be determined/limited so that possible (M, $M*N_{perGroup}$) combinations do not exceed X bits. The UE may identify a bit corresponding to the UE among the $M*N_{perGroup}$ bits based on UE group #i and UE sub-group #k to which the UE belongs. For example, the UE may determine that an $(i*k)^{th}$ bit in the bitmap including $M*N_{perGroup}$ bits is the bit corresponding to the UE. When the corresponding bit has a first value (e.g., 0), the UE may skip paging PDCCH/PDSCH monitoring, assuming that there will be no paging for the UE sub-group to which the UE belongs. When the corresponding bit has a second value (e.g., 1), the UE monitors a paging PDCCH with a P-RNTI in PO #i. When a paging message is scheduled for the UE as a result of monitoring and detecting the paging PDCCH, the UE receives a PDSCH.

Option 1-1-4) The size of total UE sub-group indication fields may be set to always remain the same, and the size of a UE sub-group indication field for each UE group may be set to be inversely proportional to the total number of UE groups for which information is distinguishable by PEI DCI. For example, when the size of bits available to represent a UE sub-group indication field is $N_{total}$, and M UE groups are distinguishable through the PEI DCI by a higher-layer signal, the $N_{total}$ bits may be divided as evenly as possible for the M UE groups (e.g. so that a UE sub-group indication field assigned to each UE group is $N_{total}/M$ bits). When this method is used, a UE sub-group indication field may provide UE group information by including the function of a UE group indication field, rather than the UE group indication field is separately configured in PEI DCI. This may be advantageous in that flexibility is provided so that the BS may control information provided through PEI in consideration of a network environment and the power consumption efficiency of a UE, while the payload of PEI DCI is configured to be maintained at a constant size.

Proposal 2: Information of UE Sub-Group Indication Field Included in PEI DCI

The fields of PEI DCI may include a field providing information about a UE sub-group (hereinafter, referred to as a UE sub-group indication field). An example of the present disclosure may include a method of interpreting information of a UE sub-group indication field, when both a UE group indication field and the UE sub-group indication field exist in PEI DCI. As a specific method, one of option 1-2-1 and option 1-2-2 below may be applied.

Option 1-2-1) When the size of the UE sub-group indication field is N bits, a UE in a UE group instructed to monitor a PO by PEI DCI may be configured to always expect UE sub-group information divided into N pieces. When the UE group indication field is configured in the PEI DCI, it may be regulated that all UE groups instructed to monitor POs by the same PEI DCI share the N-bit UE sub-group indication field.

Figure 11:
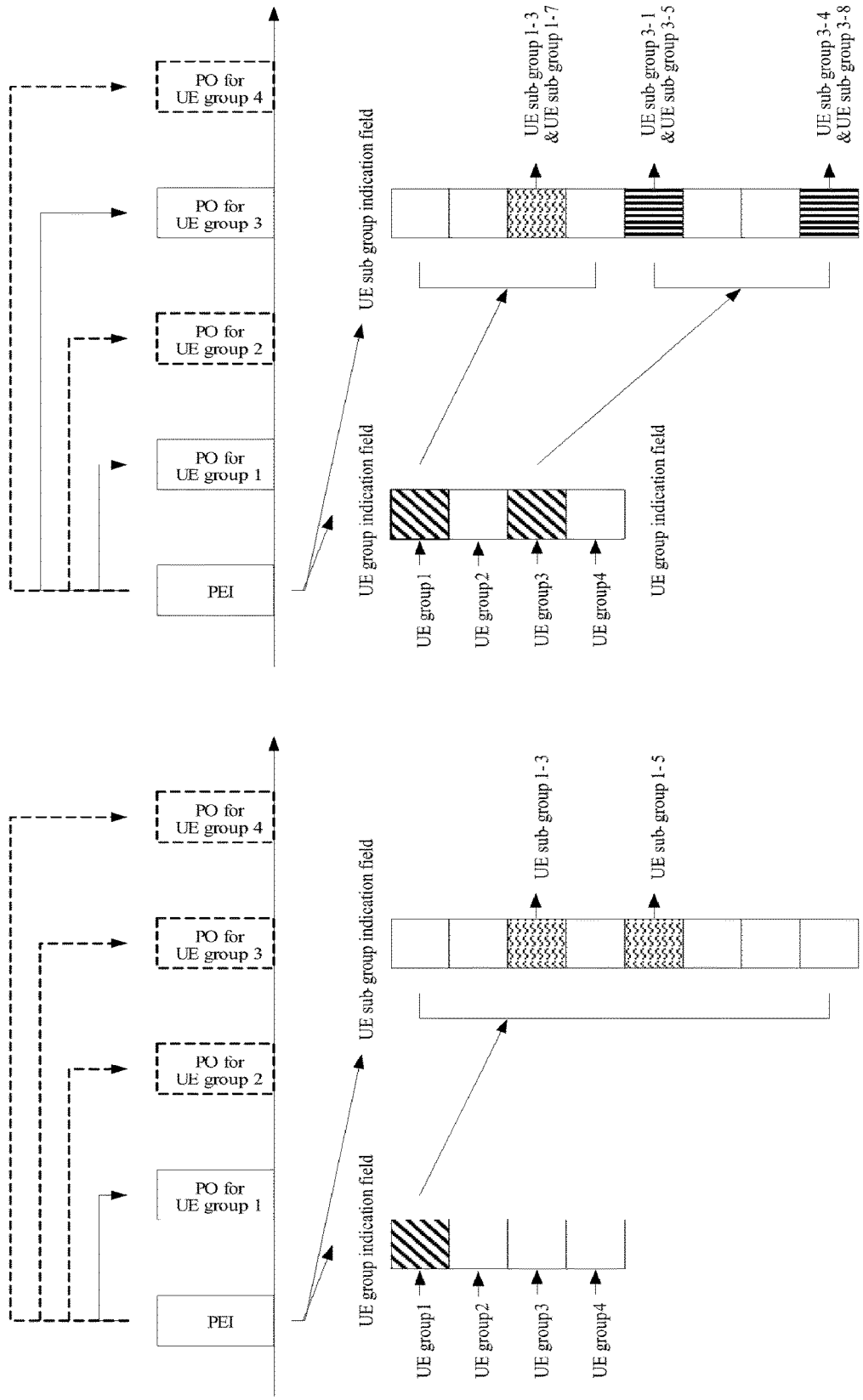
FIGS. 11, 12 and 13 illustrate methods of indicating a UE group and a UE sub-group according to various embodiments of the present disclosure.

Option 1-2-2) When the size of the UE sub-group indication field is N bits, and the number of UE groups instructed to monitor POs by PEI DCI is $M_{act}$, the UE sub-group indication field of the same PEI DCI may be divided as evenly as possible for $M_{act}$ UE groups. For example, a UE sub-group indication corresponding to each UE group may be allocated $N/M_{act}$ bits and indicated. This method is advantageous in that different UE sub-group indication information may be provided to different UE groups in a situation where a plurality of UE groups are indicated by PEI DCI, and as a smaller number of UE groups are indicated, more sub-divided UE sub-group indications may be provided. Therefore, a favorable effect may be expected in a situation where a low paging probability is expected. FIG. 11 illustrates an example of applying the proposed method, when four POs correspond to one PEI, the size of the UE group indication field is 4 bits, and the size of the UE sub-group indication field is 8 bits. In the example of FIG. 11(*a*), PO monitoring is indicated for only one UE group by a PEI, and thus all 8 bits are used for UE sub-group indication of UE group 1. In the example of FIG. 11(*a*), PO monitoring is indicated for two UE groups, and thus, 4 bits are allocated to each of the UE groups.

Proposal 3: Providing of Short Message Based on UE Group Indication Field and UE Sub-Group Indication Field In NR, paging DCI may be used for the purpose of providing short message information in addition to the purpose of scheduling a paging message. Therefore, an operation of allowing a UE, which expects to be notified whether to monitor a PO by a PEI, to expect reception of a short message as well as reception of a paging message should be provided to the UE. When the PEI includes UE group indication information and UE sub-group indication information, the simplest operation may be a method of instructing PO monitoring for all UE groups and UE sub-group indications. However, when a short message that may be repeatedly indicated during a modification period, such as an SI change notification, is included, the UE may not expect a gain of UE group/sub-group indication through repeated transmissions of the short message during the modification period. To solve this problem, when PEI DCI includes a UE group indication field and/or a UE sub-group indication field, a method of indicating a short message-related operation to a UE by the fields is proposed.

In an example of the present disclosure, when UE sub-group indication fields are included in PEI DCI and all of the UE sub-group indication fields indicate a go-to-sleep operation (i.e., in the absence of a UE sub-group to which PO monitoring is indicated by a PEI), the UE may expect that only a short message will be transmitted without scheduling of a paging message at the position(s) of PO(s) corresponding to the PEI DCI. Additionally, when the PEI DCI may indicate PO monitoring to a plurality of UE groups, a short message only operation may be indicated, only when information provided by the UE sub-group indication fields (i.e., information indicating go-to-sleep to all UE sub-groups) is satisfied for all UE groups corresponding to the PEI. This is advantageous in that because a PEI indicating go-to-sleep to all UE-subgroups is information unnecessary for the purpose of paging message scheduling, indication of only a short message may be possible without affecting scheduling of a paging message. Further, when the UE may expect a short message only operation at the position of a PO, the UE does not need to prepare to receive a PDSCH, and thus may expect the gain of power saving.

In a situation in which an operation of indicating go-to-sleep by all UE sub-group indication fields of PEI DCI is applied to indicate short message only as in the proposed method, when a UE group indication field is included in the PEI DCI, the UE group indication field of the PEI DCI may be used for the purpose of indicating the position of a PO in which the UE may expect to receive a short message. For example, when the UE sub-group indication field of the PEI DCI indicates short message only information, and the UE group indication field indicates PO monitoring to M1 UE groups among M UE groups, the UE may expect to receive paging DCI of short message only at the positions of POs corresponding to the indicated M1 UE groups. The UE may attempt to detect paging DCI at the position of a PO for another UE group, for short message reception, even though the PO does not correspond to its UE group. This method may be favorable for the purpose of providing information to allow all UE groups expecting to receive a PEI to receive a short message, even though the BS skips paging PDCCH transmission at the positions of some POs according to a network situation.

[Two Step UE Sub-Group Indication]

UE sub-group indication is a method used to indicate information about a UE to receive a paging message before PDSCH reception. The UE sub-group indication may be provided through a signal or channel transmitted before the UE decodes a scheduled PDSCH. Hereinafter, a situation in which information of the UE sub-group indication is transmitted through a PEI and a paging PDCCH is considered. Further, a structure in which information of the UE sub-group indication may be transmitted and received using both the PEI and the paging PDCCH is considered. Characteristically, an example of the present disclosure proposes a method of providing elaborate UE sub-group information, compared to information that may be provided by one signal/channel, by combining information of a PEI and information carried by a paging PDCCH into a UE sub-group indication. For convenience of description, UE sub-group information provided by a PEI is defined as Info-A, and UE sub-group information provided by a paging PDCCH is defined as Info-B.

Proposal 4: Providing Independent Information by Info-A and Info-B

In an example of the present disclosure, let an entire set of UE_IDs that may be included in one UE group be denoted by Set_UE_group. Then, all UE_IDs included in Set_UE_group may be subjected to UE sub-grouping in Info-A and Info-B. In the proposed method, UE sub-grouping may be performed independently based on different criteria in Info-A and Info-B. This implies that UE_IDs included in the same UE sub-group in Info-A may be included in different UE sub-groups in Infor-B. For example, when M1 UE sub-groups are formed in Info-A and M2 UE sub-groups are formed in Info-B, for a specific UE group, the UE sub-group index of a specific UE_ID may be determined by the following equation. In the following equation, i_A represents the index of a UE sub-group that the UE expects in a PEI, and i_B represents the index of a UE sub-group that the UE expects in a paging PDCCH, respectively. Equation 1 below is an example for describing an operation of the present disclosure, and even though the order of i_A and i_B is changed (i.e. even though the formula of i_B is applied to the PEI and the formula of i_B is applied to the paging PDCCH), the same effect may be expected.

$$i\_A = \text{floor}(UE\_ID/(N*Ns)) \bmod M1$$

$$i\_B = \text{floor}(UE\_ID/(N*Ns*M2)) \qquad \text{[Equation 1]}$$

Figure 12:
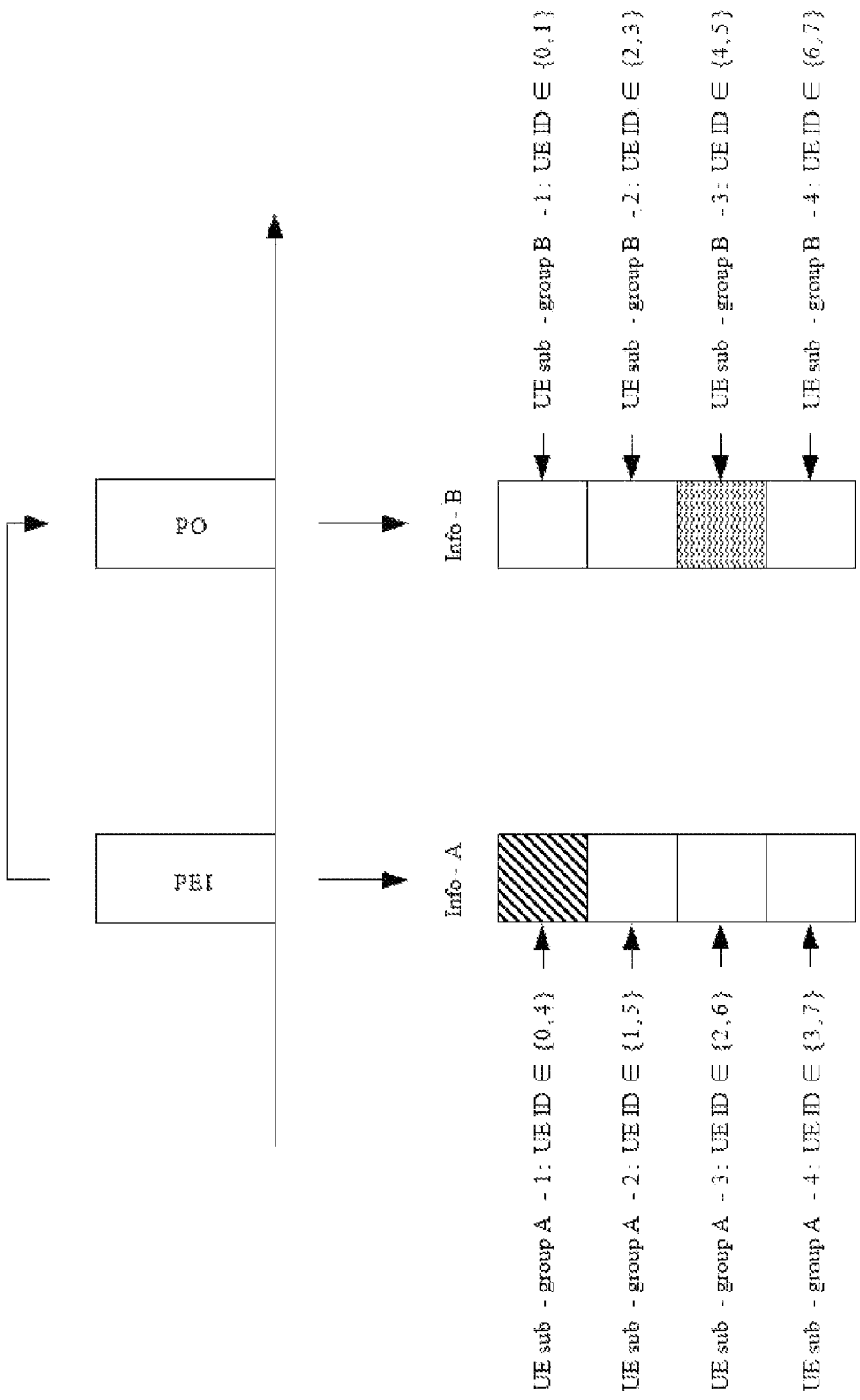

FIG. 12 illustrates an example to which the proposed method is applied. In the example of FIG. 12, while UE_IDs included in a UE group are expressed as consecutive numbers {0, 1, 2, . . . 7}, and the value of N=Ns=1 is arbitrarily selected, for convenience of description, the proposal of the disclosure is not limited to the example. As illustrated in the example of FIG. 12, Info-A and Info-B have different types of UE sub-groups, and all UE_IDs included in the UE group may be distinguished in both Info-A and Info-B.

When the BS instructs reception of a paging message for a specific UE_ID, the BS may transmit a PEI and a paging PDCCH by representing UE sub-groups including the specific UE_ID in each of Info-A and Info-B. A UE may receive Info-A and Info-B in the PEI and the paging PDCCH, respectively. When identifying its UE sub-group information in both Info-A and Info-B, the UE may expect to receive a paging message and perform a reception operation on a scheduled PDSCH. When the UE succeeds in receiving the PEI and fails in receiving a paging message reception indication corresponding to its UE_ID in Info-A of the detected PEI, the UE may not expect to receive a paging message. When the UE succeeds in receiving the paging PDCCH and fails in receiving a paging message reception indication corresponding to its UE_ID in Info-B of the detected paging PDCCH, the UE may not expect to receive a paging message. For example, in the example of FIG. 12, UE_ID #4 is included in a UE sub-group (shaded) supposed to receive a paging message in both Info-A and Info-B. When the UE succeeds in receiving both the PEI and the paging PDCCH, the UE may expect to receive the paging message. In contrast, in the example of FIG. 12, although a UE with UE_ID #0 identifies a UE sub-group index for which a paging message is destined through the PEI, the UE is excluded in the reception step of the paging PDCCH. Therefore, the UE may not expect to receive the paging message.

The proposed method may provide an advantageous effect in that the benefit of UE sub-grouping may be provided to a UE even though the UE does not receive a PEI. In a paging procedure supporting a PEI, the BS may skip a PEI transmission, and although the BS transmits a PEI, the UE may fail in receiving the PEI. As examples of these situations, (1) a case in which a default operation for a UE is configured as monitoring an associated PO, when the UE fails in receiving a PEI, (2) a case in which a UE has knowledge of a condition under which a BS does not transmit a PEI at a specific position, and the UE is allowed to monitor a PO for this condition, or (3) a case in which a UE autonomously performs paging PDCCH monitoring directly without monitoring a PEI may be considered. Characteristically, when the UE skips a PEI reception at a specific position according to one of these conditions and succeeds in receiving a paging PDCCG by paging PDCCH monitoring, the UE may determine whether to receive a PDSCH for reception of a paging message, based only on Info-B. This may be done to allow the UE to expect UE sub-group information just by receiving a paging PDCCH, when the UE misses a PEI or the UE may skip a PEI reception according to a pre-agreed rule between the UE and the BS. Alternatively, this method may advantageously provide a structure in which even when the UE skips a PEI reception in consideration of its situation (e.g., power consumption efficiency), the UE may achieve the gain of UE sub-grouping just with a paging PDCCH. For example, when a UE with UE_ID #4 and a UE with UE_ID #5 succeed in receiving a paging PDCCH, the UEs may perform a PDSCH reception operation to receive a paging message in the example of FIG. 12.

In the above proposed method, UE sub-grouping information is provided in two steps, which is favorable for distinguishing elaborately classified UE sub-groups. Further, because a structure is provided, in which a UE may obtain and use partial UE sub-group information even in a situation in which the UE receives only a paging PDCCH according to the characteristics of the UE and a PEI, the UE sub-grouping-based power saving effect may be expected.

While the proposed method has been described above in the context of selection of a UE sub-group index based on a UE_ID, it is equally applicable to UE sub-group indication which is not based on a UE_ID. For example, a method of indicating the indexes (i.e. i_A and/or i_B) of a UE sub-group to be applied to Info-A and Info-B in consideration of characteristics of some UE by a BS (or its upper node) may also be used along.

Proposal 5: Determination of Infor-B Based on Info-A

In an example of the present disclosure, let an entire set of UE_IDs that may be included in one UE group be denoted by Set_UE_group. Then, all UE_IDs included in Set_UE_group may be subject to UE sub-grouping in Info-A, and Info-B may be configured based on information about UE sub-groups determined in Info-A. For example, Info-B may provide UE sub-group information about only UE sub-groups to which PO monitoring is indicated in Info-A. For example, when M1 UE sub-groups are formed for a specific UE group in Info-A, and PO monitoring is indicated to $M1_{act}$ UE sub-groups among the M1 UE sub-groups, a UE sub-group indication field delivering Info-B may be divided into $M1_{act}$ areas, and the $M1_{act}$ areas may be allocated to the respective $M1_{act}$ areas UE sub-groups. For example, when the size of the UE sub-group indication field delivering Info-B is M2 bits, the size of the UE sub-group indication field in Info-B corresponding to each UE sub-group defined in Info-A may be floor($M2/M1_{act}$).

Figure 13:
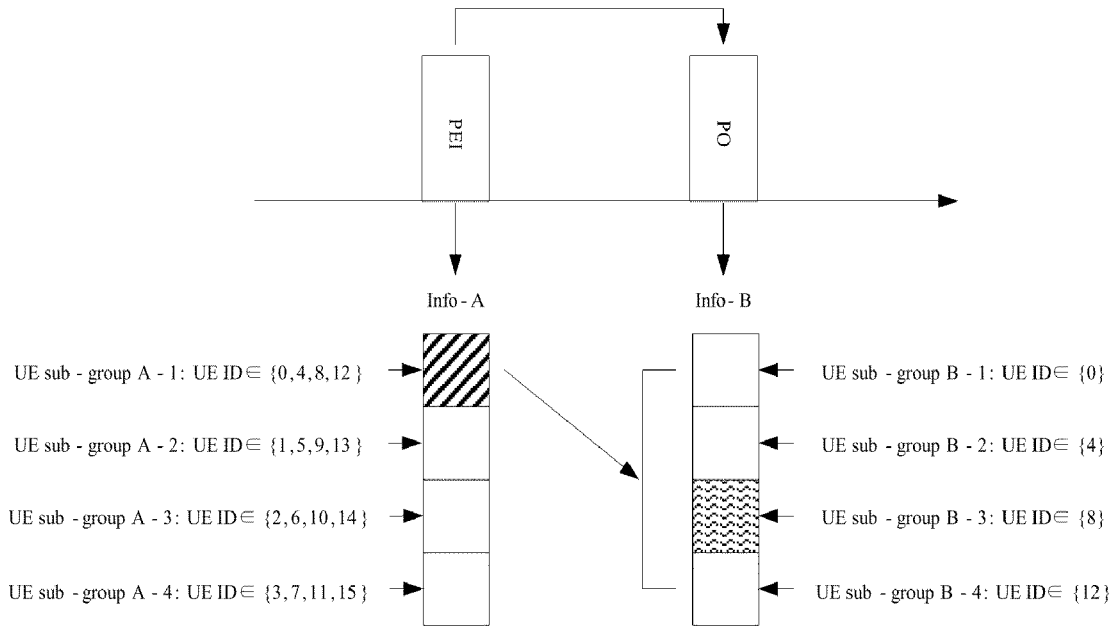
Figure 13:
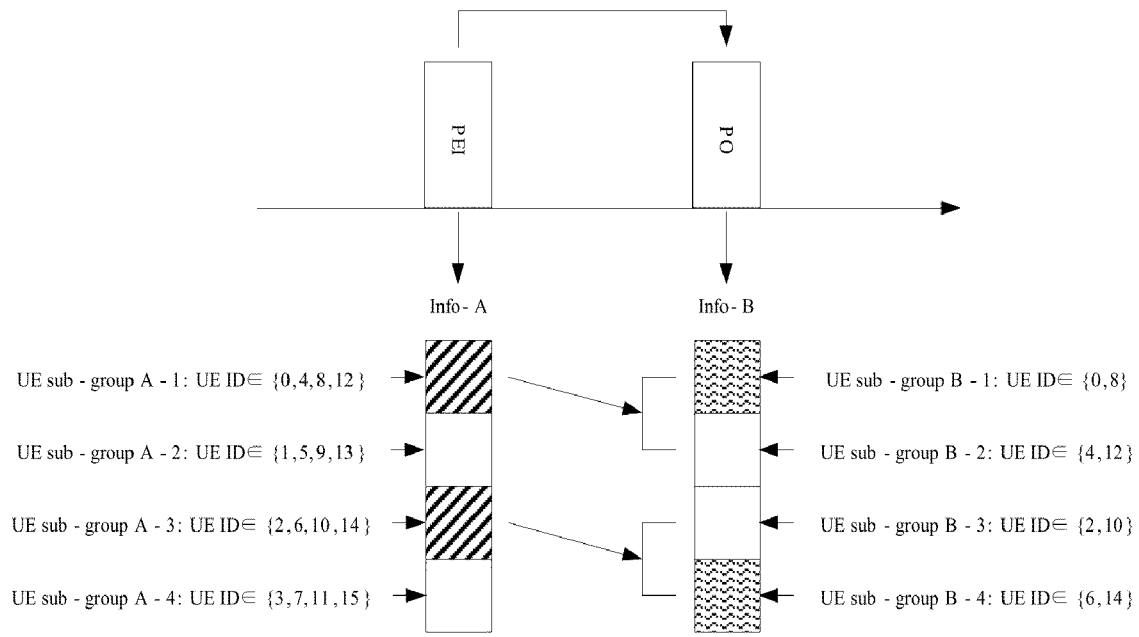

FIG. 13 illustrates an example of the proposed method. In the examples of FIG. 12, a structure in which a 4-bit UE sub-group indication field may be configured in each of a PEI and a paging PDCCH. FIG. 13(*a*) illustrates a case in which one UE sub-group (UE sub-group A-1 in the example of FIG. 13) is indicated by the PEI. In this case, The UE sub-group indication field of the paging PDCCH may all be used for the purpose of refining UE_IDs belonging to UE sub-group A-1. On the other hand, FIG. 13(*b*) illustrates a case where two UE sub-groups (UE sub-groups A-1 and A-3 in the example of FIG. 13) are indicated by the PEI. In this case, the UE sub-group indication field of the paging PDCCH may be used for the purpose of refining UE_IDs by evenly distributing 2 bits to each of UE sub-groups A-1 and A-3.

According to the proposed method, a UE sub-group is indicated in Info-B by further dividing UE sub-groups defined in Info-A. Therefore, UE sub-grouping may be refined in a manner that reduces the influence between UE sub-groups defined in Info-A. Further, the refining level of adding UE sub-groups is determined adaptively according to the number of indicated UE sub-groups, which leads to efficient bit management.

Figure 15:
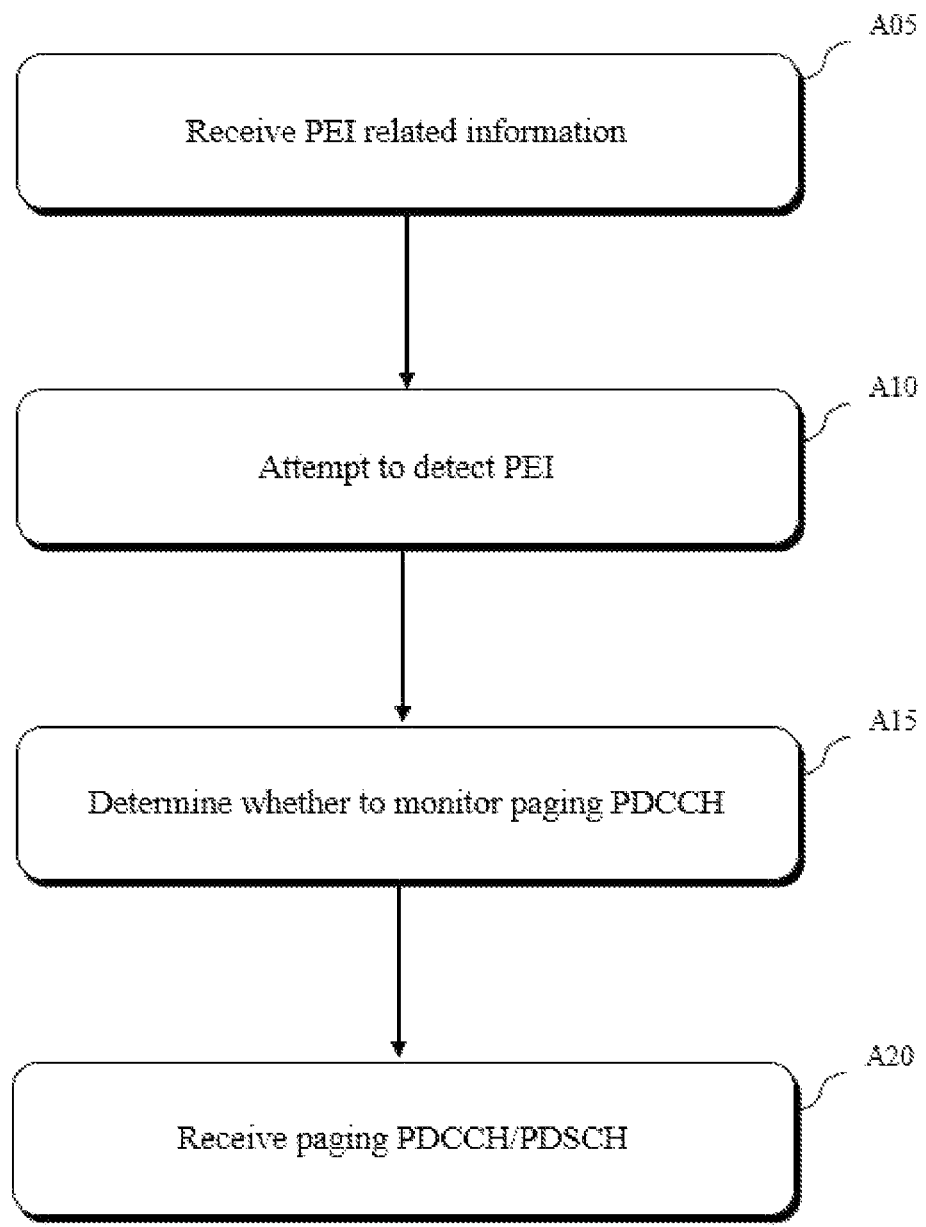
FIG. 15 is a flowchart illustrating a method of receiving a signal by a UE according to an embodiment of the present disclosure.

FIG. 15 is a flowchart illustrating a signal reception method of a UE according to an embodiment of the present disclosure. Because FIG. 15 is a specific implementation example of the foregoing examples, the scope of the present disclosure is not limited to FIG. 15. The foregoing descriptions may be referred to for FIG. 15.

Referring to FIG. 15, the UE may receive PEI-related information by higher-layer signaling (A05).

The UE may attempt to detect a PEI associated with 'M' POs based on the PEI-related information (A10).

The UE may determine whether to perform or skip PDCCH monitoring in a specific PO related to the UE among the plurality of POs, based on the detected PEI (A15).

In a state in which the UE determined to perform the PDCCH monitoring, the UE may receive at least one of paging DCI carried by the PDCCH or a PDSCH scheduled by the paging DCI (A20).

The 'M' POs are associated with 'M' UE groups, respectively, and each UE group may include 'N' UE sub-groups.

The specific PO related to the UE may be a PO associated with a specific UE group to which the UE belongs, and the specific UE group may be determined based on a UE_ID allocated to the UE.

The PEI may include a UE sub-group indication field with a variable size.

The UE may process the PEI by assuming that the UE sub-group indication field includes total 'M*N' bits, based on the number of UE groups being 'M' and the number of UE sub-groups per UE group being 'N'.

The UE may determine whether to perform or skip monitoring of the PDCCH based on a bit value of a specific bit related to a specific UE sub-group to which the UE belongs among the total 'M*N' bits The UE may determine the number of UE groups to be 'M' and the number of UE sub-groups per UE group to be 'N', based on the PEI-related information received through the higher-layer signaling.

The PEI may be PEI-related DCI different from the paging DCI.

At least part of the PEI-related information may be received in an SIB.

The UE may determine the number 'M' of UE groups based on the SIB.

The UE may determine to receive the PDSCH, based on the specific UE sub-group to which the UE belongs being identified in the paging DCI as well as in the PEI.

The UE may determine not to receive the PDSCH, based on the specific UE sub-group to which the UE belongs being identified in the PEI and not being identified in the paging DCI.

The paging DCI may include UE cluster information based on a clustering method different from a UE sub-grouping method related to the PEI.

The UE may determine to receive the PDCCH based on the UE belonging to a specific UE cluster indicated by the paging DCI.

Figure 16:
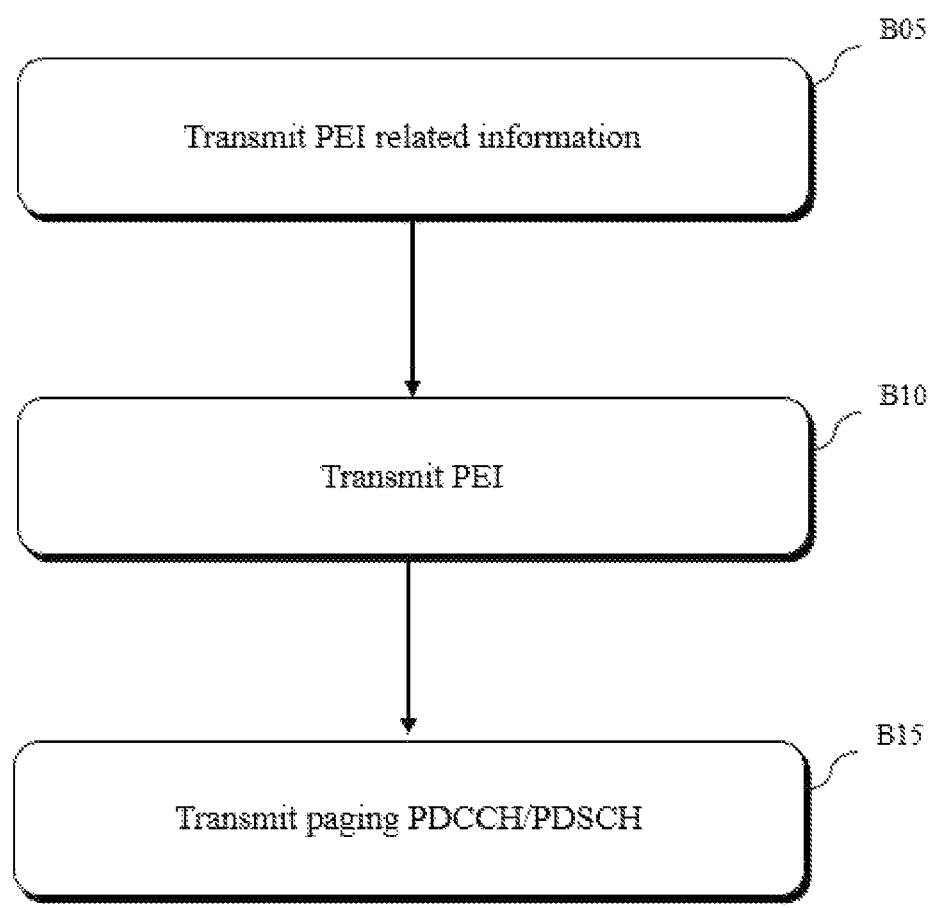
FIG. 16 is a flowchart illustrating a method of transmitting a signal by a UE according to an embodiment of the present disclosure.

FIG. 16 is a flowchart illustrating a signal transmission method of a UE according to an embodiment of the present disclosure. Because FIG. 16 is a specific implementation example of the foregoing examples, the scope of the present disclosure is not limited to FIG. 16. The foregoing descriptions may be referred to for FIG. 16.

A BS may transmit PEI-related information through higher-layer signaling (B05). The BS may transmit a PEI associated with 'M'POs based on the PEI-related information (B10).

The BS may transmit a PDCCH in a specific PO related to a first UE among the plurality of POs (B15).

The 'M' POs may be associated with 'M' UE groups, respectively, and each UE group may include 'N' UE sub-groups.

The specific PO related to the first UE may be a PO associated with a specific UE group to which the first UE belongs, and the specific UE group may be determined based on a UE_ID allocated to the first UE.

The PEI may include a UE sub-group indication field with a variable size.

The BS may configure the UE sub-group indication field with total 'M*N' bits, based on the number of UE groups being 'M' and the number of UE sub-groups per UE group being 'N'.

The BS may instruct the first UE to monitor the PDCCH by a bit value of a specific bit related to a specific UE sub-group to which the first UE belongs among the total 'M*N' bits.

The BS may signal to the first UE that the number of UE groups is 'M' and the number of UE sub-groups per UE group is 'N' by the PEI-related information.

Various descriptions, functions, procedures, proposals, methods, and/or operation flowcharts of the present disclosure may be applied to, but not limited to, various fields requiring wireless communication/connection (e.g., 5G) between devices.

Specific examples will be described in detail with reference to the drawings. In the following drawings/descriptions, the same reference numerals may denote the same or corresponding hardware blocks, software blocks, or functional blocks, unless otherwise indicated.

Figure 17:
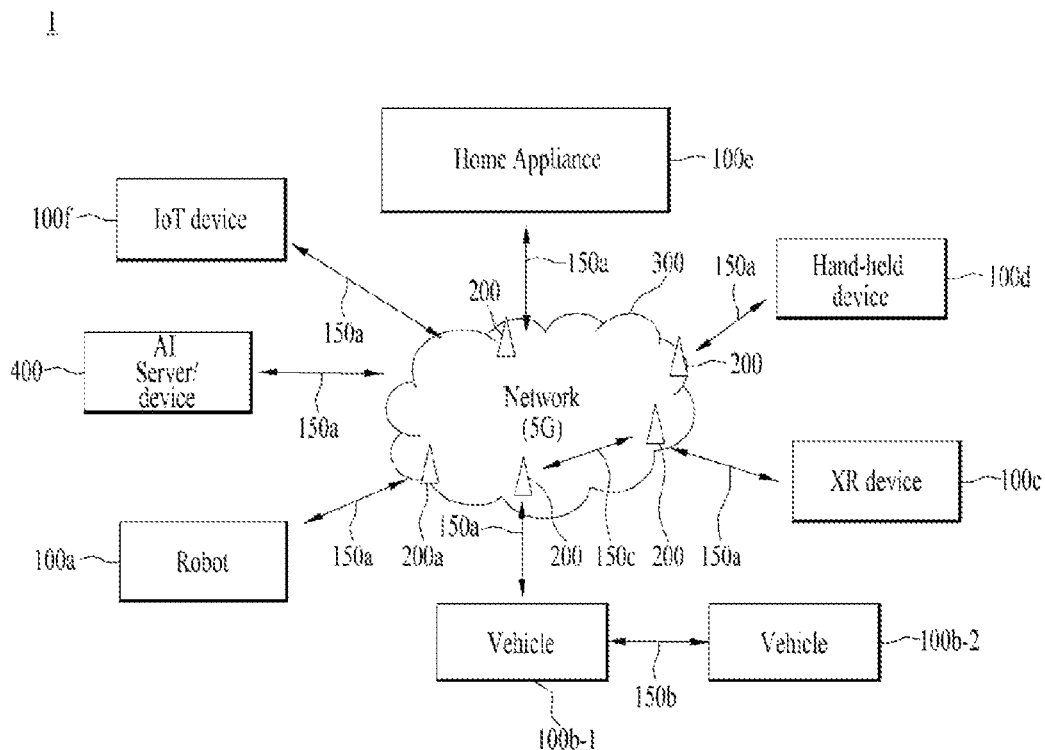
FIGS. 17 to 20 illustrate an example of a communication system 1 and wireless devices applicable to the present disclosure.

FIG. 17 illustrates a communication system 1 applied to the present disclosure.

Referring to FIG. 17, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 18:
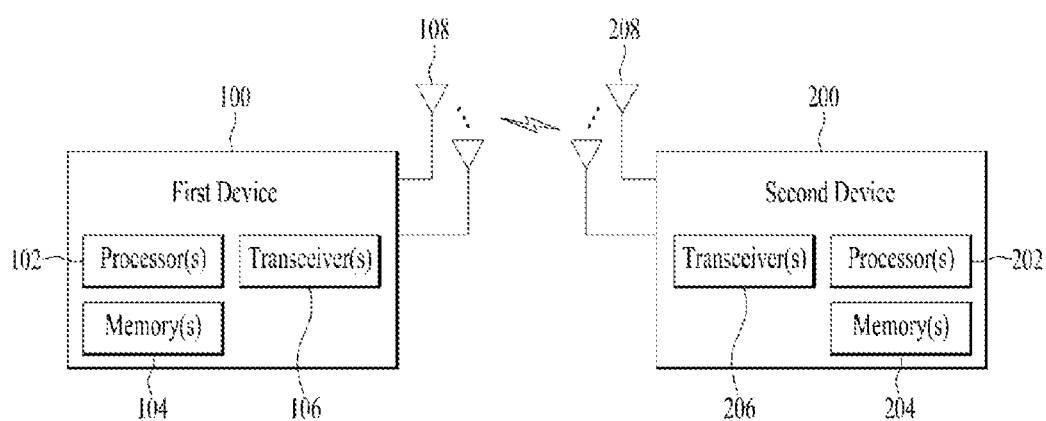

FIG. 18 illustrates wireless devices applicable to the present disclosure.

Referring to FIG. 18, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 17.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In an embodiment of the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In an embodiment of the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 19:
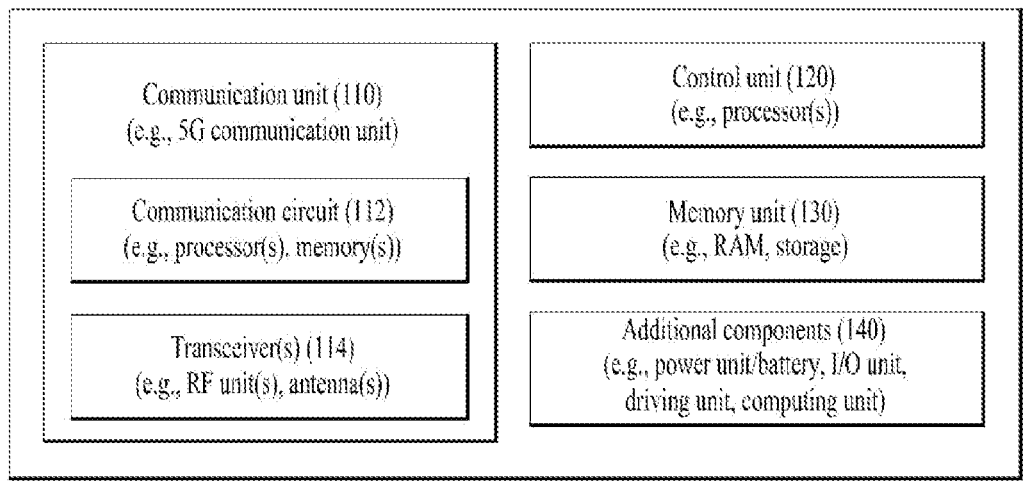

FIG. 19 illustrates another example of a wireless device applied to the present disclosure. The wireless device may be implemented in various forms according to a use-case/service (refer to FIG. 17).

Referring to FIG. 19, wireless devices 100 and 200 may correspond to the wireless devices 100 and 200 of FIG. 18 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 18. For example, the transceiver(s) 114 may include the one or more transceivers 106 and 206 and/or the one or more antennas 108 and 208 of FIG. 18. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 17), the vehicles (100b-1 and 100b-2 of FIG. 17), the XR device (100c of FIG. 17), the hand-held device (100d of FIG. 17), the home appliance (100e of FIG. 17), the IoT device (100f of FIG. 17), a digital broadcast terminal, a hologram device, a public safety device, an MTC device, a medicine device, a fintech device (or a finance device), a security device, a climate/environment device, the AI server/device (400 of FIG. 17), the BSs (200 of FIG. 17), a network node, etc. The wireless device may be used in a mobile or fixed place according to a use-example/service.

In FIG. 19, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 20:
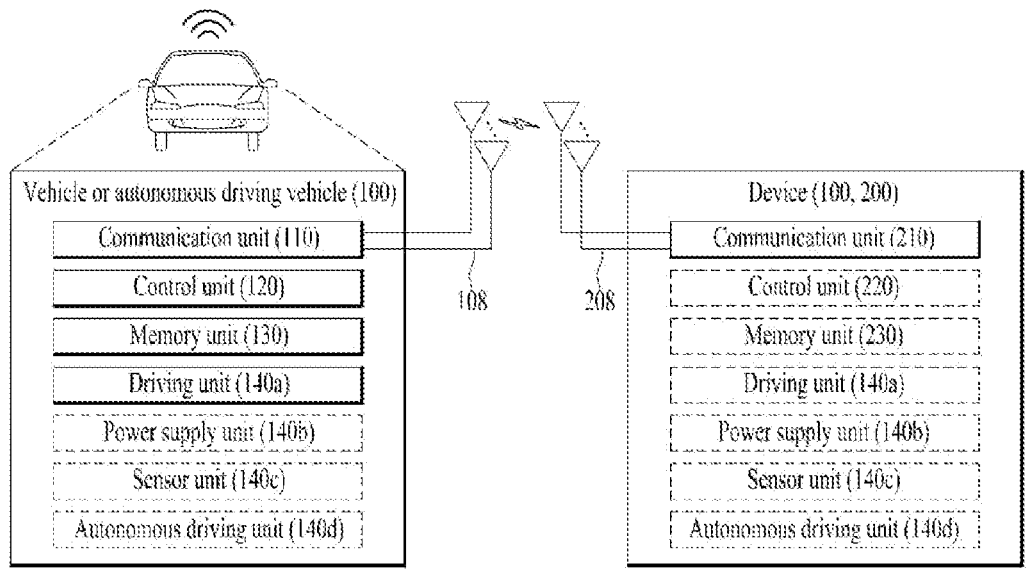

FIG. 20 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 20, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 19, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 21:
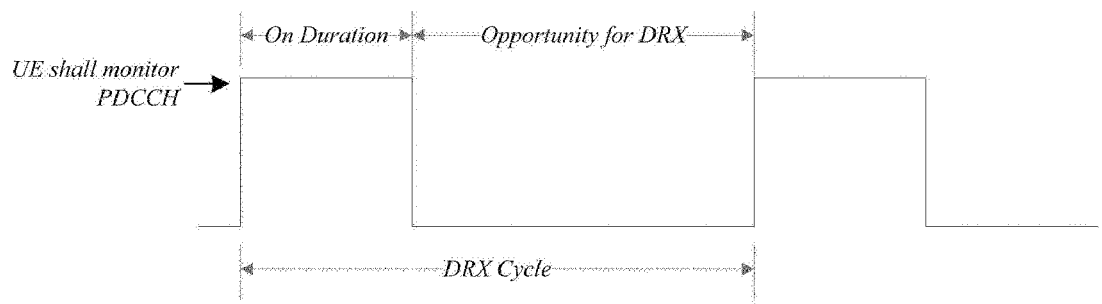
FIG. 21 illustrates an exemplary discontinuous reception (DRX) operation applicable to the present disclosure.

FIG. 21 is a diagram illustrating a DRX operation of a UE according to an embodiment of the present disclosure.

The UE may perform a DRX operation in the afore-described/proposed procedures and/or methods. A UE configured with DRX may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state. DRX in the RRC_CONNECTED state (RRC_CONNECTED DRX) will be described below.

Referring to FIG. 21, a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, PDCCH monitoring/reception may be performed discontinuously in the time domain in the afore-described/proposed procedures and/or methods. For example, when DRX is configured, PDCCH reception occasions (e.g., slots with PDCCH SSs) may be configured discontinuously according to a DRX configuration in an embodiment of the present disclosure. On the contrary, when DRX is not configured, PDCCH monitoring/reception may be performed continuously in the time domain. For example, when DRX is not configured, PDCCH reception occasions (e.g., slots with PDCCH SSs) may be configured continuously in an embodiment of the present disclosure. Irrespective of whether DRX is configured, PDCCH monitoring may be restricted during a time period configured as a measurement gap.

Table 6 describes a DRX operation of a UE (in the RRC_CONNECTED state). Referring to Table 6, DRX configuration information is received by higher-layer signaling (e.g., RRC signaling), and DRX ON/OFF is controlled by a DRX command from the MAC layer. Once DRX is configured, the UE may perform PDCCH monitoring discontinuously in performing the afore-described/proposed procedures and/or methods.

TABLE 6

| | Type of signals | UE procedure |
|---|---|---|
| 1st step | RRC signalling (MAC-CellGroupConfig) | Receive DRX configuration information |
| 2nd Step | MAC CE ((Long) DRX command MAC CE) | Receive DRX command |
| 3rd Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-OnDurationTimer: defines the duration of the starting period of the DRX cycle.

Value of drx-InactivityTimer: defines the duration of a time period during which the UE is awake after a PDCCH occasion in which a PDCCH indicating initial UL or DL data has been detected Value of drx-HARQ-RTT-TimerDL: defines the duration of a maximum time period until a DL retransmission is received after reception of a DL initial transmission.

Value of drx-HARQ-RTT-TimerDL: defines the duration of a maximum time period until a grant for a UL retransmission is received after reception of a grant for a UL initial transmission.

drx-LongCycleStartOffset: defines the duration and starting time of a DRX cycle.

drx-ShortCycle (optional): defines the duration of a short DRX cycle.

When any of drx-OnDurationTimer, drx-InactivityTimer, drx-HARQ-RTT-TimerDL, and drx-HARQ-RTT-TimerDL is running, the UE performs PDCCH monitoring in each PDCCH occasion, staying in the awake state.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, an embodiment may be configured by combining claims failing to have relation of explicit citation in the appended claims together or can be included as new claims by amendment after filing an application.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is applicable to UEs, BSs, or other apparatuses in a wireless mobile communication system.

The invention claimed is:

1. A method of receiving a signal by a user equipment (UE) in a wireless communication system, the method comprising:
receiving paging early indication (PEI)-related information through higher-layer signaling;
attempting to detect a PEI associated with 'M' paging occasions (POs) based on the PEI-related information;
determining whether to perform or skip monitoring of a physical downlink control channel (PDCCH) in a specific PO related to the UE among the plurality of POs, based on the detected PEI; and
receiving at least one of paging downlink control information (DCI) carried by the PDCCH or a physical downlink shared channel (PDSCH) scheduled by the paging DCI, in a state in which the UE determines to perform monitoring of the PDCCH,
wherein the 'M' POs are associated with 'M' UE groups, respectively, and each UE group includes 'N' UE sub-groups,
wherein the specific PO related to the UE is a PO associated with a specific UE group to which the UE belongs, and the specific UE group is determined based on a UE_ID allocated to the UE,
wherein the PEI includes a UE sub-group indication field with a variable size, and the UE processes the PEI by assuming that the UE sub-group indication field includes total 'M*N' bits, based on a number of UE groups being 'M' and a number of UE sub-groups per UE group being 'N',
wherein the UE determines whether to perform or skip monitoring of the PDCCH based on a bit value of a specific bit related to a specific UE sub-group to which the UE belongs among the total 'M*N' bits, and
wherein the UE determines the number of UE groups to be 'M' and the number of UE sub-groups per UE group to be 'N', based on the PEI-related information received through the higher-layer signaling.

2. The method according to claim 1, wherein the PEI is PEI-related DCI different from the paging DCI.

3. The method according to claim 1, wherein at least part of the PEI-related information is received in a system information block (SIB).

4. The method according to claim 3, wherein the UE determines the number 'M' of UE groups based on the SIB.

5. The method according to claim 1, wherein the UE determines to receive the PDSCH, based on the specific UE sub-group to which the UE belongs being identified in the paging DCI as well as in the PEI.

6. The method according to claim 1, wherein the UE determines not to receive the PDSCH, based on the specific UE sub-group to which the UE belongs being identified in the PEI and not being identified in the paging DCI.

7. The method according to claim 1, wherein the paging DCI includes UE cluster information based on a clustering method different from a UE sub-grouping method related to the PEI.

8. The method according to claim 7, wherein the UE determines to receive the PDCCH based on the UE belonging to a specific UE cluster indicated by the paging DCI.

9. A processor-readable recording medium recording a program for performing the method according to claim 1.

10. A device for controlling a user equipment (UE) for wireless communication, the device comprising:
a memory storing instructions; and
a processor configured to perform operations by executing the instructions,
wherein the operations of the processor includes:
receiving paging early indication (PEI)-related information through higher-layer signaling;
attempting to detect a PEI associated with 'M' paging occasions (POs) based on the PEI-related information;
determining whether to perform or skip monitoring of a physical downlink control channel (PDCCH) in a specific PO related to the UE among the plurality of POs, based on the detected PEI; and
receiving at least one of paging downlink control information (DCI) carried by the PDCCH or a physical downlink shared channel (PDSCH) scheduled by the paging DCI, in a state in which the processor determines to perform monitoring of the PDCCH,
wherein the 'M' POs are associated with 'M' UE groups, respectively, and each UE group includes 'N' UE sub-groups,
wherein the specific PO related to the UE is a PO associated with a specific UE group to which the UE belongs, and the specific UE group is determined based on a UE_ID allocated to the UE, wherein the PEI includes a UE sub-group indication field with a variable size, and the processor is configured to process the PEI by assuming that the UE sub-group indication field includes total 'M*N' bits, based on a number of UE groups being 'M' and a number of UE sub-groups per UE group being 'N', wherein the processor is configured to determine whether to perform or skip monitoring of the PDCCH based on a bit value of a specific bit related to a specific UE sub-group to which the UE belongs among the total 'M*N' bits, and wherein the processor is configured to determine the number of UE groups to be 'M' and the number of UE sub-groups per UE group to be 'N', based on the PEI-related information received through the higher-layer signaling.

11. A user equipment (UE) for wireless communication, the UE comprising:

a transceiver; and a processor configured to receive paging early indication (PEI)-related information through higher-layer signaling by controlling the transceiver, attempt to detect a PEI associated with 'M' paging occasions (POs) based on the PEI-related information, determine whether to perform or skip monitoring of a physical downlink control channel (PDCCH) in a specific PO related to the UE among the plurality of POs, based on the detected PEI, and receive at least one of paging downlink control information (DCI) carried by the PDCCH or a physical downlink shared channel (PDSCH) scheduled by the paging DCI, in a state in which the processor determines to perform monitoring of the PDCCH, wherein the 'M' POs are associated with 'M' UE groups, respectively, and each UE group includes 'N' UE sub-groups, wherein the specific PO related to the UE is a PO associated with a specific UE group to which the UE belongs, and the specific UE group is determined based on a UE_ID allocated to the UE, wherein the PEI includes a UE sub-group indication field with a variable size, and the processor is configured to process the PEI by assuming that the UE sub-group indication field includes total 'M*N' bits, based on a number of UE groups being 'M' and a number of UE sub-groups per UE group being 'N', wherein the processor is configured to determine whether to perform or skip monitoring of the PDCCH based on a bit value of a specific bit related to a specific UE sub-group to which the UE belongs among the total 'M*N' bits, and wherein the processor is configured to determine the number of UE groups to be 'M' and the number of UE sub-groups per UE group to be 'N', based on the PEI-related information received through the higher-layer signaling.

12. A method of transmitting a signal by a base station (BS) in a wireless communication system, the method comprising:

transmitting paging early indication (PEI)-related information through higher-layer signaling;

transmitting a PEI associated with 'M' paging occasions (POs) based on the PEI-related information; and transmitting a physical downlink control channel (PDCCH) in a specific PO related to a first user equipment (UE) among the plurality of POs, wherein the 'M' POs are associated with 'M' UE groups, respectively, and each UE group includes 'N' UE sub-groups, wherein the specific PO related to the first UE is a PO associated with a specific UE group to which the first UE belongs, and the specific UE group is determined based on a UE_ID allocated to the first UE, wherein the PEI includes a UE sub-group indication field with a variable size, and the BS configures the UE sub-group indication field with total 'M*N' bits, based on a number of UE groups being 'M' and a number of UE sub-groups per UE group being 'N', wherein the BS instructs the first UE to monitor the PDCCH by a bit value of a specific bit related to a specific UE sub-group to which the first UE belongs among the total 'M*N' bits, and wherein the BS signals to the first UE that the number of UE groups is 'M' and the number of UE sub-groups per UE group is 'N' by the PEI-related information.

13. A base station (BS) for wireless communication, the BS comprising:

a transceiver; and a processor configured to transmit paging early indication (PEI)-related information through higher-layer signaling by controlling the transceiver, transmit a PEI associated with 'M' paging occasions (POs) based on the PEI-related information, and transmit a physical downlink control channel (PDCCH) in a specific PO related to a first user equipment (UE) among the plurality of POs, wherein the PEI includes a UE sub-group indication field with a variable size, and the processor configures the UE sub-group indication field with total 'M*N' bits, based on a number of UE groups being 'M' and a number of UE sub-groups per UE group being 'N', wherein the processor instructs the first UE to monitor the PDCCH by a bit value of a specific bit related to a specific UE sub-group to which the first UE belongs among the total 'M*N' bits, and wherein the processor signals to the first UE that the number of UE groups is 'M' and the number of UE sub-groups per UE group is 'N' by the PEI-related information.

* * * * *